(12) United States Patent
Inoue

(10) Patent No.: US 9,378,902 B2
(45) Date of Patent: Jun. 28, 2016

(54) COMPOSITE OPERATING DEVICE BIASED TO THE NEUTRAL POSITION

(71) Applicant: SUMITOMO WIRING SYSTEMS, LTD., Yokkaichi, Mie (JP)

(72) Inventor: Masatomo Inoue, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 237 days.

(21) Appl. No.: 14/039,634

(22) Filed: Sep. 27, 2013

(65) Prior Publication Data

US 2014/0102867 A1 Apr. 17, 2014

(30) Foreign Application Priority Data

Oct. 15, 2012 (JP) .................................. 2012-227934

(51) Int. Cl.
  *H01H 19/00* (2006.01)
  *H01H 3/02* (2006.01)
  *B60N 2/02* (2006.01)
  *H01H 25/00* (2006.01)

(52) U.S. Cl.
  CPC .............. *H01H 3/02* (2013.01); *B60N 2/0228* (2013.01); *H01H 25/002* (2013.01)

(58) Field of Classification Search
  CPC ....................................................... H01H 3/02
  USPC .......... 200/17 R, 4, 512, 6 R, 6 A, 16 A, 336, 200/341, 337, 241, 252, 273
  See application file for complete search history.

(56) References Cited

U.S. PATENT DOCUMENTS

| | | | |
|---|---|---|---|
| 6,484,119 B1 * | 11/2002 | Kaneo | G06F 3/0338 310/364 |
| 6,700,565 B2 * | 3/2004 | Niiyama | H01H 25/002 200/5 A |
| 7,282,656 B2 * | 10/2007 | Niiyama | 200/5 R |

(Continued)

FOREIGN PATENT DOCUMENTS

| | | |
|---|---|---|
| EP | 2 088 608 A1 | 8/2009 |
| JP | 2008-135324 A | 6/2008 |
| JP | A-2011-165380 | 8/2011 |

OTHER PUBLICATIONS

Dec. 3, 2015 Office Action issued in European Application No. 13 185 094.3.

(Continued)

*Primary Examiner* — Vanessa Girardi
(74) *Attorney, Agent, or Firm* — Oliff PLC

(57) ABSTRACT

A composite operating device is provided having a small number of components to retain an operating member in a neutral position. A composite operating device includes an operating member that is operable to rotate and to slide a slider and a base. One of the base and the slider includes a flexible portion that is capable of elastic bending deformation relative to the other, the flexible portion including a first engagement portion. The other includes a second engagement portion that retains the slider in the neutral position by engaging with the first engagement portion. The second engagement portion presses against the first engagement portion while being displaced in the sliding direction relative to the first engagement portion to cause bending deformation of the flexible portion. The amount of deformation of the flexible portion increases with the amount of operation of the operating member in the sliding direction.

10 Claims, 15 Drawing Sheets

(56) References Cited

U.S. PATENT DOCUMENTS

| | | |
|---|---|---|
| 8,410,379 B2 * | 4/2013 | Kuno et al. ............... 200/4 |
| 8,822,853 B2 * | 9/2014 | Jahn et al. ............... 200/17 R |
| 2012/0073939 A1 | 3/2012 | Jahn et al. |
| 2014/0102244 A1 * | 4/2014 | Inoue ............... B60N 2/0228 74/553 |
| 2014/0102245 A1 * | 4/2014 | Inoue ............... B60N 2/0228 74/553 |

OTHER PUBLICATIONS

Jan. 22, 2014 European Search Report issued in European Patent Application No. 13185094.3.

* cited by examiner

COMPOSITE OPERATING DEVICE BIASED TO THE NEUTRAL POSITION

BACKGROUND

This application claims priority to Japanese Application No. 2012-227934, which was filed on Oct. 15, 2012.

Exemplary implementations of the broad inventive principles described herein provide a composite operating device that is used to operate an electronic apparatus installed in a vehicle or the like.

Conventionally, among operating devices that are provided in various electronic apparatuses, a composite operating device including an operating member that is operable to rotate about a specific axis of rotation and also operable to slide in a direction orthogonal to the axis of rotation is known. For example, when installed in a vehicle such as an automobile, such a composite operating device is used to operate, for example, a car navigation system, a seat of the vehicle, or the like.

Generally, there is a demand for improvement in the operability of an operating member of such a composite operating device. Specifically, if the operating member slides during a rotating operation of the operating member, the operating feel will be degraded, and furthermore an unintended signal may be output. For this reason, there is a need to prevent displacement of the operating member in the sliding direction and to retain it in a neutral position during a rotating operation of the operating member.

To meet this need, JP 2008-135324A discloses a composite operating device including an operating member that is operable to rotate about a specific axis of rotation and also operable to slide in a direction orthogonal to the axis of rotation, a retaining member that rotatably retains the operating member, and a plurality of compression springs that are arranged between the operating member and the retaining member and retain the operating member in the neutral position.

JP 2008-135324A is an example of related art.

The composite operating device disclosed in JP 2008-135324A employs the plurality of compression springs to retain the operating member in the neutral position. Thus, there is a problem that it has a large number of components. In addition, the compression springs are extremely small. Therefore, the compression springs require careful handling and are also associated with difficulty in assembly. Moreover, automation of assembly of these compression springs is also difficult.

SUMMARY

Exemplary implementations solve problems such as those described above, and it is an object thereof to provide a composite operating device that consists of a small number of components and enables a structure that retains an operating member in the neutral position to be easily achieved.

In order to solve problems such as those described above, exemplary implementations provide a composite operating device including an operating member that is operable to rotate about a specific axis of rotation and operable to slide in a direction orthogonal to the axis of rotation, a slider that rotatably retains the operating member and slides in the same direction as a sliding direction of the operating member in conjunction with a sliding operation of the operating member, and a base that retains the slider so as to allow the slider to slide in the sliding direction, wherein one of the base and the slider includes a flexible portion that is capable of elastic bending deformation in a predetermined direction relative to the other, the flexible portion including a first engagement portion that engages with the other of the base and the slider, the other of the base and the slider includes a second engagement portion that engages with the first engagement portion in a state in which no operating force in the sliding direction is applied to the operating member, thereby retaining the slider in a neutral position in which the slider is not displaced in the sliding direction, the second engagement portion being shaped such that when an operating force in the sliding direction is applied to the operating member, the second engagement portion presses against the first engagement portion while being displaced in the sliding direction relative to the first engagement portion, thereby causing bending deformation of the flexible portion, and the first engagement portion and the second engagement portion are shaped such that an amount of deformation of the flexible portion increases with an amount of operation of the operating member in the sliding direction.

According to exemplary implementations, a structure is constructed which retains the operating member in the neutral position by engagement between the first engagement portion included in the flexible portion of one of the base and the slider and the second engagement portion of the other and allows sliding of the operating member by bending deformation of the flexible portion. Thus, the number of components is reduced, and the assembly process is simplified. Specifically, one of the base and the slider includes the flexible portion that is capable of elastic bending deformation in the predetermined direction relative to the other, the flexible portion having the first engagement portion that engages with the other of the base and the slider, while the other of the base and the slider includes the second engagement portion that engages with the first engagement portion in a state in which no operating force in the sliding direction is applied to the operating member, thereby retaining the slider in the neutral position, the second engagement portion being shaped such that when an operating force in the sliding direction is applied to the operating member, the second engagement portion presses against the first engagement portion while being displaced in the sliding direction relative to the first engagement portion, thereby causing bending deformation of the flexible portion. In addition, the first engagement portion and the second engagement portion are shaped such that the amount of deformation of the flexible portion, or in other words, the returning force of the flexible portion increases with the amount of operation of the operating member in the sliding direction. Thus, the base and the slider together construct a structure that retains the operating member in the neutral position and also allows sliding of the operating member while providing a resistance that acts to retain the operating member in the neutral position. Accordingly, compression springs as conventionally employed are omitted. Also, a structure that retains the operating member in the neutral position is achieved by a simple process of mounting the slider to the base.

In an exemplary embodiment, it is preferable that the base includes the flexible portion and a base main body that supports the slider, the slider includes the second engagement portion, the flexible portion is integrally formed with the base main body so as to be continuous with the base main body and is capable of bending deformation in the predetermined direction relative to the base main body, the first engagement portion includes a locking portion that locks the slider such that in a state in which no operating force in the sliding direction is applied to the operating member, the slider is retained in the neutral position, and the second engagement portion includes a locked portion that is locked into the locking portion when no operating force in the sliding direction is applied to the operating member and that presses against the first engagement portion, thereby causing bending deformation of the flexible portion, when an operating force in the sliding direction is applied to the operating member.

In this case, it is preferable that when a direction that is parallel to the axis of rotation is referred to as a first direction, the flexible portion extends from the base main body in a second direction that is orthogonal to each of the first direction and the sliding direction, and is capable of elastic deformation so as to allow the first engagement portion to be displaced in the first direction, and the first engagement portion has a shape whose dimension gradually increases in the first direction from the neutral position toward an outer side in the sliding direction.

With the above-described configuration, when the operating member is operated in the sliding direction and the flexible portion is thus elastically deformed, the first engagement portion exerts on the second engagement portion resistance forces generated by the flexible portion behaving to cancel the elastic deformation, that is, a resistance force generated by the flexible portion behaving to cancel displacement of the first engagement portion in the first direction (i.e., bending deformation of the flexible portion) and a resistance force generated by the flexible portion behaving to cancel displacement of the first engagement portion around a intersecting axis coinciding with a straight line, of straight lines parallel to the second direction, that traverses the flexible portion and that intersects the axis of rotation (i.e., torsional deformation of the flexible portion). Thus, the operating member is even more reliably retained in the neutral position.

Furthermore, in this case, it is preferable that the flexible portion includes a base end portion that is continuous with the base main body and a displacement end portion that is an end portion on a side that is opposite to the base end portion and constitutes a free end, and the first engagement portion is formed in the displacement end portion.

With this configuration, the flexible portion is in the form of a cantilever. Thus, it is easy to adjust the amount of displacement of the displacement end portion, that is, the retaining force that retains the operating member in the neutral position.

As described above, according exemplary implementations, a composite operating device that consists of a small number of components and enables a structure that retains the operating member in the neutral position to be easily achieved can be provided.

DETAILED DESCRIPTION OF THE EMBODIMENTS

First Embodiment

A composite operating device according to a first embodiment will be described with reference to FIGS. 1 to 9.

Figure 1:
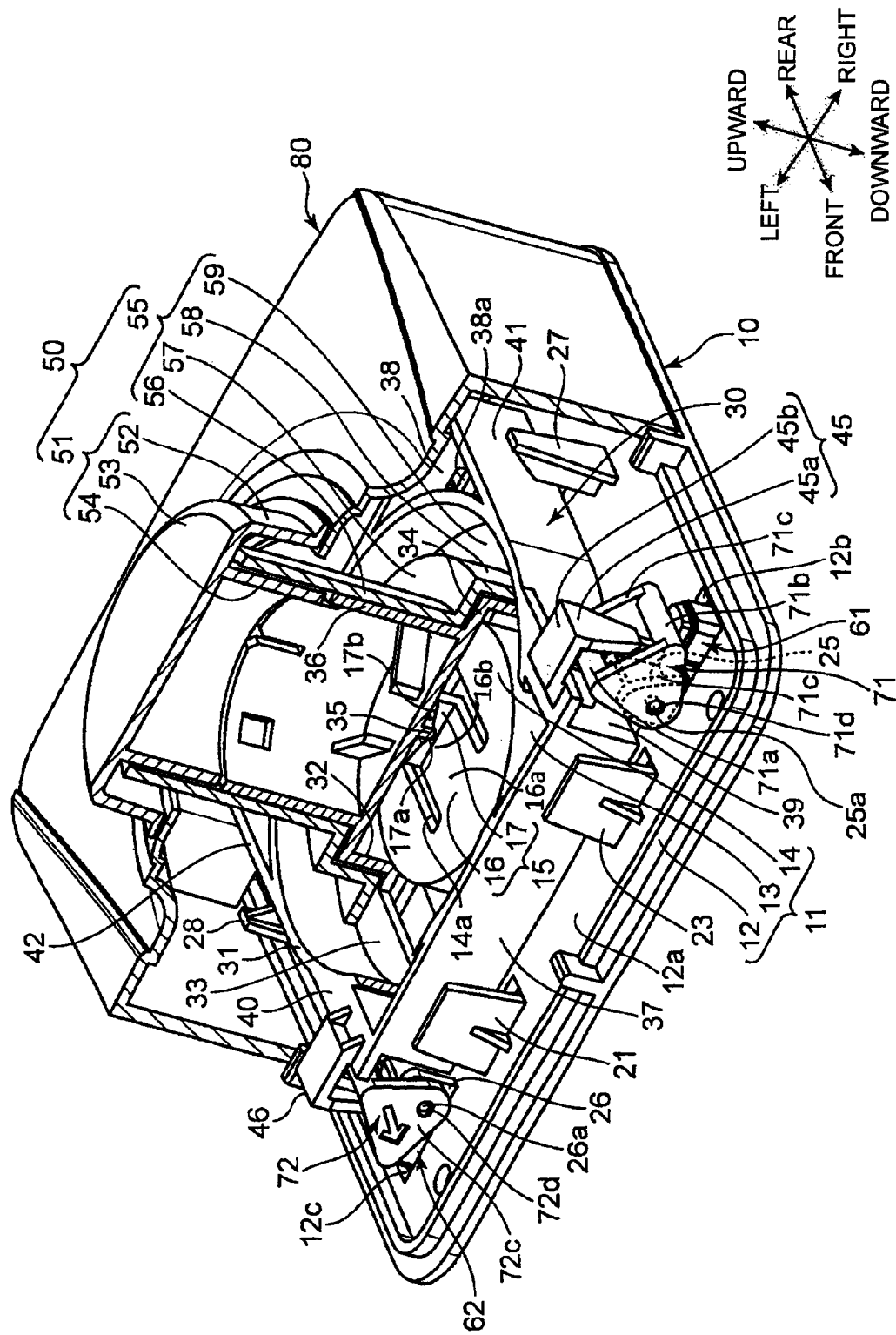
FIG. 1 is a partially cut-away perspective view of a composite operating device according to a first embodiment.

As shown in FIG. 1, a composite operating device of this embodiment includes a base 10, a slider 30 that is supported by the base 10 so as to be slidable in a specific sliding direction relative to the base 10, an operating member 50 that is operable to rotate about a specific axis of rotation and also operable to slide in the sliding direction, a first detecting element 61 that detects a sliding operation of the operating member 50 toward a first side, a second detecting element 62 that detects a sliding operation of the operating member 50 toward a second side, a first transmission member 71 that transmits an operating force acting on the slider 30 due to a sliding operation of the operating member 50 toward the first side to the first detecting element 61, a second transmission member 72 that transmits an operating force acting on the slider 30 due to a sliding operation of the operating member 50 toward the second side to the second detecting element 62, and a panel 80 that is attached to the base 10. In this embodiment, the base 10, the slider 30, and the operating member 50 have plane symmetry, where an orthogonal plane that is orthogonal to the sliding direction and passes through the axis of rotation is the plane of symmetry.

In the following description, as indicated in FIG. 1, a direction (first direction) that is parallel to the axis of rotation will be referred to as "vertical direction", the sliding direction of the operating member 50 and the slider 30 will be referred to as "left-right direction", and a direction (second direction) that is orthogonal to each of the vertical direction and the left-right direction will be referred to as "front-rear direction" or "slide restriction direction". Moreover, a position in which the operating member 50 and the slider 30 are not displaced in the sliding direction relative to the base 10 will be referred to as "neutral position".

Figure 2:
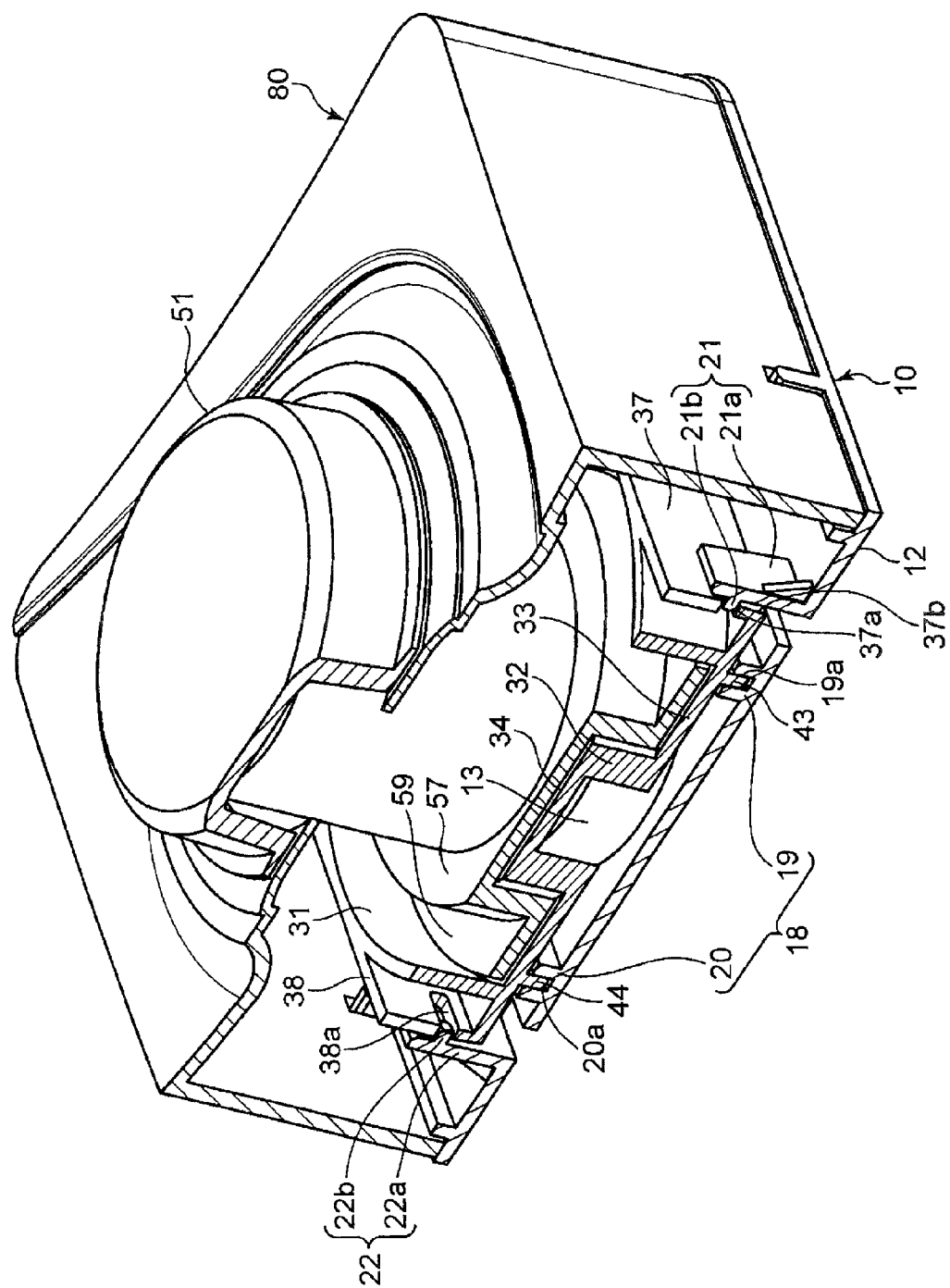
FIG. 2 is a perspective view showing a cross section viewed from a different angle than in FIG. 1.
Figure 3:
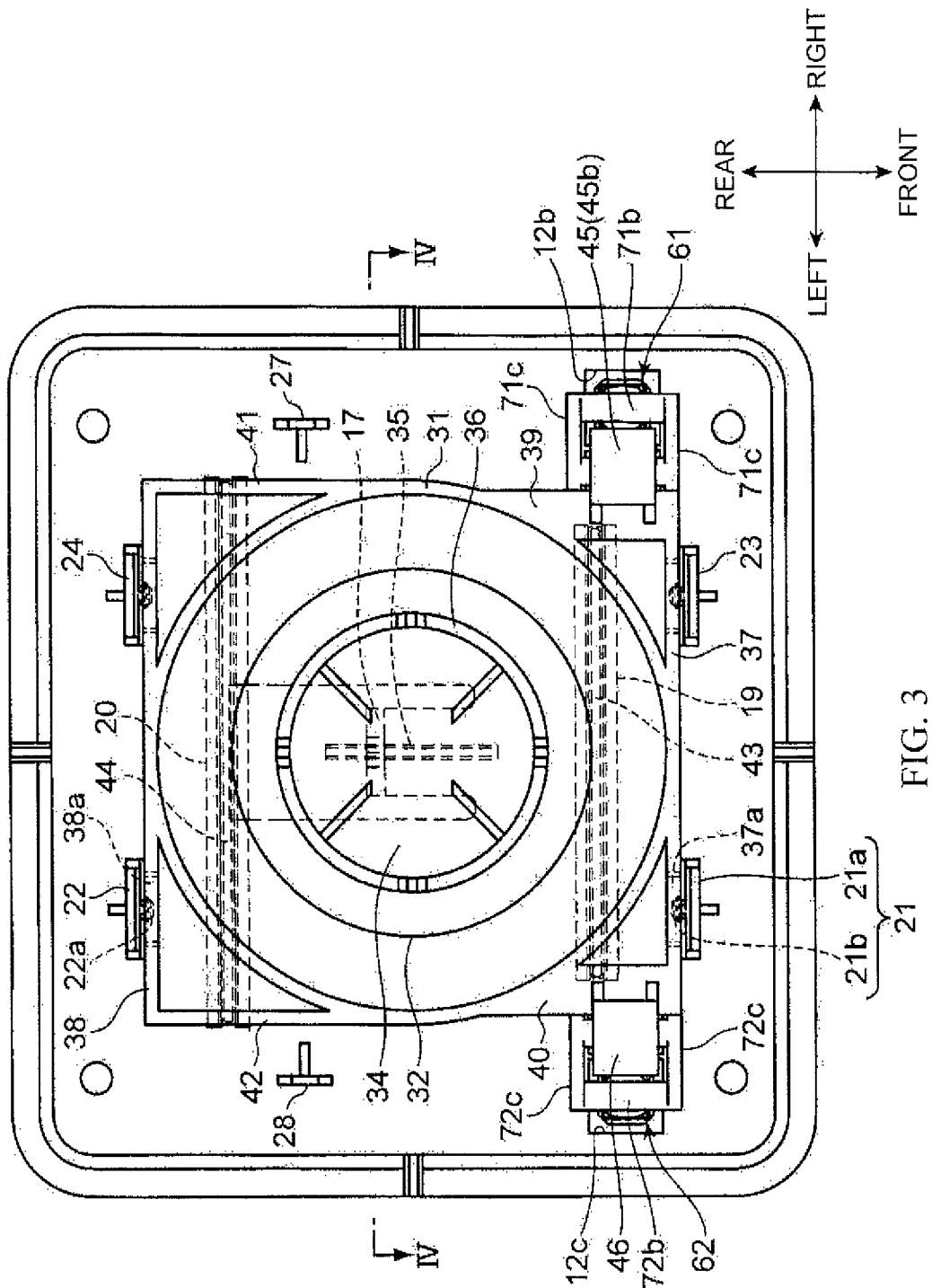
FIG. 3 is a plan view of the composite operating device shown in FIG. 1 in a state in which an operating member and a panel are omitted.

As shown in FIGS. 1 to 3, the base 10 has a base main body 11, a flexible portion 15 that can be deformed to bend in a predetermined direction relative to the base main body 11, a guiding portion 18 that guides the slider 30 in the sliding direction, a first restricting portion 21 to a fourth restricting portion 24 that restrict displacement of the slider 30 in a direction (upward direction) away from the base main body 11, a first transmission member retaining portion 25 that retains the first transmission member 71, a second transmission member retaining portion 26 that retains the second transmission member 72, as well as a first stopper portion 27 and a second stopper portion 28 that abut against the slider 30 in the sliding direction. Note that the operating member 50 and the panel 80 are omitted from FIG. 3.

The base main body 11 has a flat plate portion 12 having an opposing surface 12*a* that faces the slider 30 in the vertical direction, a circumferential wall 13 extending upward from the opposing surface 12*a*, and an upper wall 14 that is connected to an upper end of the circumferential wall 13. As shown in FIG. 3, the flat plate portion 12 has a rectangular shape when viewed from above. The flat plate portion 12 has a first hole 12*b* that exposes the first detecting element 61 to the side of the slider 30 (upper side), and a second hole 12*c* that exposes the second detecting element 62 to the side of the slider 30 (upper side). The first hole 12*b* is formed in a right (the upper side in FIG. 3) end portion of the flat plate portion 12 in the sliding direction, and the second hole 12*c* is formed in a left (the lower side in FIG. 3) end portion of the flat plate portion 12 in the sliding direction. The circumferential wall 13 extends upward from a central portion of the flat plate portion 12. The upper wall 14 is parallel to the flat plate portion 12. Slits 14*a* are formed in the upper wall 14. The slits 14*a* extend rearward from respective positions that are spaced apart from each other in the sliding direction, and are shaped such that their rear ends are continuous with each other. Thus, the flexible portion 15 can be deformed to bend in the vertical direction relative to the upper wall 14.

The flexible portion 15 is integrally formed with the upper wall 14 so as to be continuous with the upper wall 14. The flexible portion 15, in conjunction with the second engagement portion 35, which will be described later, retains the operating member 50 and the slider 30 in the neutral position. Also, the flexible portion 15 is capable of bending deformation, thereby allowing the operating member 50 to slide while providing a resistance that acts to retain the operating member 50 in the neutral position. Specifically, when no operating force in the sliding direction is applied to the operating member 50, the flexible portion 15 locks the second engagement portion 35, thereby retaining the operating member 50 in the neutral position. When an operating force in the sliding direction is applied to the operating member 50, the flexible portion 15 is deformed to bend in a direction (downward) away from the second engagement portion 35 so as to release locking of the second engagement portion 35, thereby allowing the operating member 50 to slide, and also a returning force of the flexible portion 15 acts as a resistance force in a direction in which the second engagement portion 35 is forced to move toward the neutral position.

In this embodiment, the flexible portion 15 has a flexible piece 16 and a first engagement portion 17. The flexible piece 16 has a base end portion 16*a* that is continuous with the upper wall 14 on one end side (front side) in the slide restriction direction and a displacement end portion 16*b* that is an end portion on the side (rear side) that is opposite to the base end portion 16*a* and constitutes a free end. That is, the flexible piece 16 is in the form of a cantilever extending from the upper wall 14 in the front-rear direction, and is capable of bending deformation so that its free end side is displaced in the vertical direction relative to the upper wall 14. The first engagement portion 17 is provided in the displacement end portion 16*b* of the flexible piece 16. The first engagement portion 17 has a shape that gradually increases in vertical dimension from the center in the sliding direction toward the outer sides in the sliding direction. The first engagement portion 17 has a locking portion 17*a* that is formed at the center in the sliding direction, and a sliding surface 17*b* that continuously extends from the locking portion 17*a* toward both of the outer sides in the left-right direction. The locking portion 17*a* locks the second engagement portion 35 by abutting against the second engagement portion 35 from both sides in the sliding direction, thereby retaining the slider 30 in the neutral position. The sliding surface 17*b* linearly extends gradually upward from the locking portion 17*a* toward both of the outer sides in the sliding direction.

As shown in FIGS. 2 and 3, the guiding portion 18 has a first guiding portion 19 and a second guiding portion 20 that are formed at positions located on opposite sides of the axis of rotation and spaced apart from each other in the slide restriction direction. The guiding portions 19 and 20 each protrude from the opposing surface 12*a* to the side of the slider 30 (upper side), and are elongated in the sliding direction. The first guiding portion 19 has an outer rail portion and an inner rail portion that is formed nearer to the axis of rotation than the outer rail portion is and faces the outer rail portion at a predetermined distance from the outer rail portion. Like the first guiding portion 19, the second guiding portion 20 also has an outer rail portion and an inner rail portion. In other words, the guiding portions 19 and 20 each have a recess that is open to the side of the slider 30. In the first guiding portion 19, a first guided portion 43, which will be described later, is sandwiched between the outer rail portion and the inner rail portion. In the second guiding portion 20, a second guided portion 44, which will be described later, is sandwiched between the outer rail portion and the inner rail portion.

First to fourth restricting portions 21 to 24 are each located outside the guiding portion 18 with respect to the slide restriction direction and protrude from the opposing surface 12*a* to the side of the slider 30 (upper side). As shown in FIG. 3, the first restricting portion 21 is formed outside the first guiding portion 19 (forward of the first guiding portion 19) with respect to the slide restriction direction. The second restricting portion 22 is formed outside the second guiding portion 20 with respect to the slide restriction direction. The third restricting portion 23 is formed at a position that is located outside the first guiding portion 19 with respect to the slide restriction direction and at a distance from the first restricting portion 21 to the right side with respect to the sliding direction. The fourth restricting portion 24 is formed at a position that is located outside the second guiding portion 20 with respect to the slide restriction direction and at a distance from the second restricting portion 22 to the right side with respect to the sliding direction.

Figure 7:
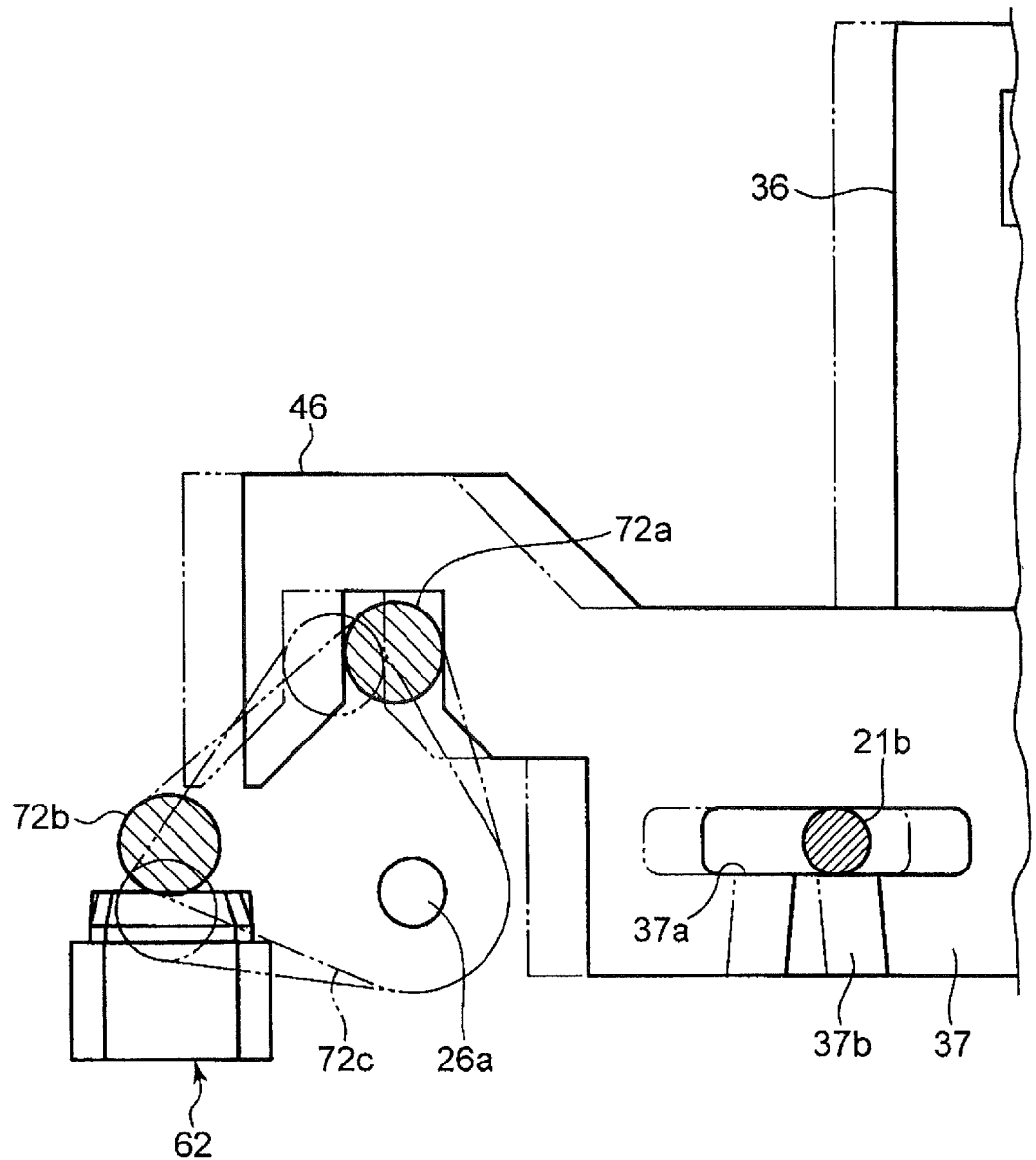
FIG. 7 is a diagram showing a behavior of the transmission member.

The first restricting portion 21 has a first upright protruding piece 21*a* protruding upright from the opposing surface 12*a* to the side of the slider 30, and a first sliding contact portion 21*b* protruding inward (rearward) in the slide restriction direction from the first upright protruding piece 21*a*. The first upright protruding piece 21*a* can be deformed to bend so as to allow the first sliding contact portion 21*b* to be displaced outward (forward) in the slide restriction direction. As shown in FIGS. 2 and 7, the first sliding contact portion 21*b* has a cylindrical shape with a central axis extending in a direction parallel to the slide restriction direction. The first sliding contact portion 21*b* slides in the sliding direction while coming into line contact with a first restricted surface 37*a*, which will be described later. That is to say, the first sliding contact portion 21*b* comes into contact with the first restricted surface 37a from the side (upper side) that is opposite to the opposing surface 12a, thereby restricting displacement of the slider 30 in a direction away from the base 10, and also comes into sliding contact with the first restricted surface 37a in the sliding direction, thereby allowing the slider 30 to slide.

The second restricting portion 22 is plane-symmetrical to the first restricting portion 21, where a parallel plane that is parallel to the sliding direction and passes through the axis of rotation is the plane of symmetry. That is, the second restricting portion 22 has a second upright protruding piece 22a protruding upright from the opposing surface 12a to the side of the slider 30, and a second sliding contact portion 22b protruding inward (to the side of the first restricting portion 21) in the slide restriction direction from the second upright protruding piece 22a. Note that the second upright protruding piece 22a and the second sliding contact portion 22b also are plane-symmetrical to the first upright protruding piece 21a and the first sliding contact portion 21b, where the parallel plane is the plane of symmetry, and so a description of the second upright protruding piece 22a and the second sliding contact portion 22b will be omitted.

The third restricting portion 23 is plane-symmetrical to the first restricting portion 21, where the orthogonal plane is the plane of symmetry. The fourth restricting portion 24 is plane-symmetrical to the second restricting portion 22, where the orthogonal plane is the plane of symmetry. In other words, the third restricting portion 23 corresponds to a figure produced by a translation of the first restricting portion 21 to the right, and the fourth restricting portion 24 corresponds to a figure produced by a translation of the second restricting portion 22 to the right. Therefore, a description of the third restricting portion 23 and the fourth restricting portion 24 will be omitted.

Note that although the base 10 of this embodiment has the first to fourth restricting portions 21 to 24, it is sufficient that the base 10 has at least one restricting portion.

The first transmission member retaining portion 25 is formed forward of the parallel plane and rightward of the third restricting portion 23. More specifically, the first transmission member retaining portion 25 is formed between the slider 30 and the first hole 12b. The first transmission member retaining portion 25 has a center shaft 25a that extends in the slide restriction direction. The second transmission member retaining portion 26 is plane-symmetrical to the first transmission member retaining portion 25, where the orthogonal plane is the plane of symmetry. That is, the second transmission member retaining portion 26 has a center shaft 26a that extends in the slide restriction direction (see FIGS. 1 and 6).

The first stopper portion 27 protrudes from the opposing surface 12a to the side of the slider 30 (upper side). As shown in FIG. 3, the first stopper portion 27 is formed rearward of the parallel plane and rightward of the slider 30. The first stopper portion 27 defines a right end (stroke end of the operating member 50) of sliding of the slider 30 in the sliding direction. That is, when the slider 30 slides to the right, the first stopper portion 27 abuts against the slider 30, thereby restricting sliding of the slider 30. The second stopper portion 28 is plane-symmetrical to the first stopper portion 27, where the orthogonal plane is the plane of symmetry. Therefore, a description of the second stopper portion 28 will be omitted.

The slider 30 has a retaining portion 31 that retains the operating member 50, an inner tube portion 32 that is formed inside the retaining portion 31, a bottom wall 33, an opposing wall 34 that faces the upper wall 14, the second engagement portion 35 that is engageable with the first engagement portion 17, an attachment tube portion 36 to which the operating member 50 is attached, a first restricted wall 37 that is restricted by the first and third restricting portions 21 and 23, a second restricted wall 38 that is restricted by the second and fourth restricting portions 22 and 24, a first transmission member pressing portion 39 that presses against the first transmission member 71, a second transmission member pressing portion 40 that presses against the second transmission member 72, a first abutment wall 41 that abuts against the first stopper portion 27, a second abutment wall 42 that abuts against the second stopper portion 28, the first guided portion 43 that is guided by the first guiding portion 19, the second guided portion 44 that is guided by the second guiding portion 20, a first clamp portion 45 that holds the first transmission member 71 from both sides, and a second clamp portion 46 that holds the second transmission member 72 from both sides.

The retaining portion 31 has a cylindrical shape that is coaxial with the axis of rotation, and retains the operating member 50 from outside such that the operating member 50 is rotatable about the axis of rotation. The retaining portion 31 is larger than the operating member 50. That is, the operating member 50 is rotatably retained inside the retaining portion 31.

The inner tube portion 32 is formed inside the retaining portion 31. The inner tube portion 32 has a cylindrical shape that is coaxial with the axis of rotation and is smaller than the retaining portion 31.

The bottom wall 33 connects a lower end of the retaining portion 31 to a lower end of the inner tube portion 32. The bottom wall 33 has a flat plate-like shape and faces the opposing surface 12a while being oriented such that it is parallel to the opposing surface 12a.

The opposing wall 34 has a circular plate-like shape that closes an upper end of the inner tube portion 32, and is parallel to the bottom wall 33.

Figure 4:
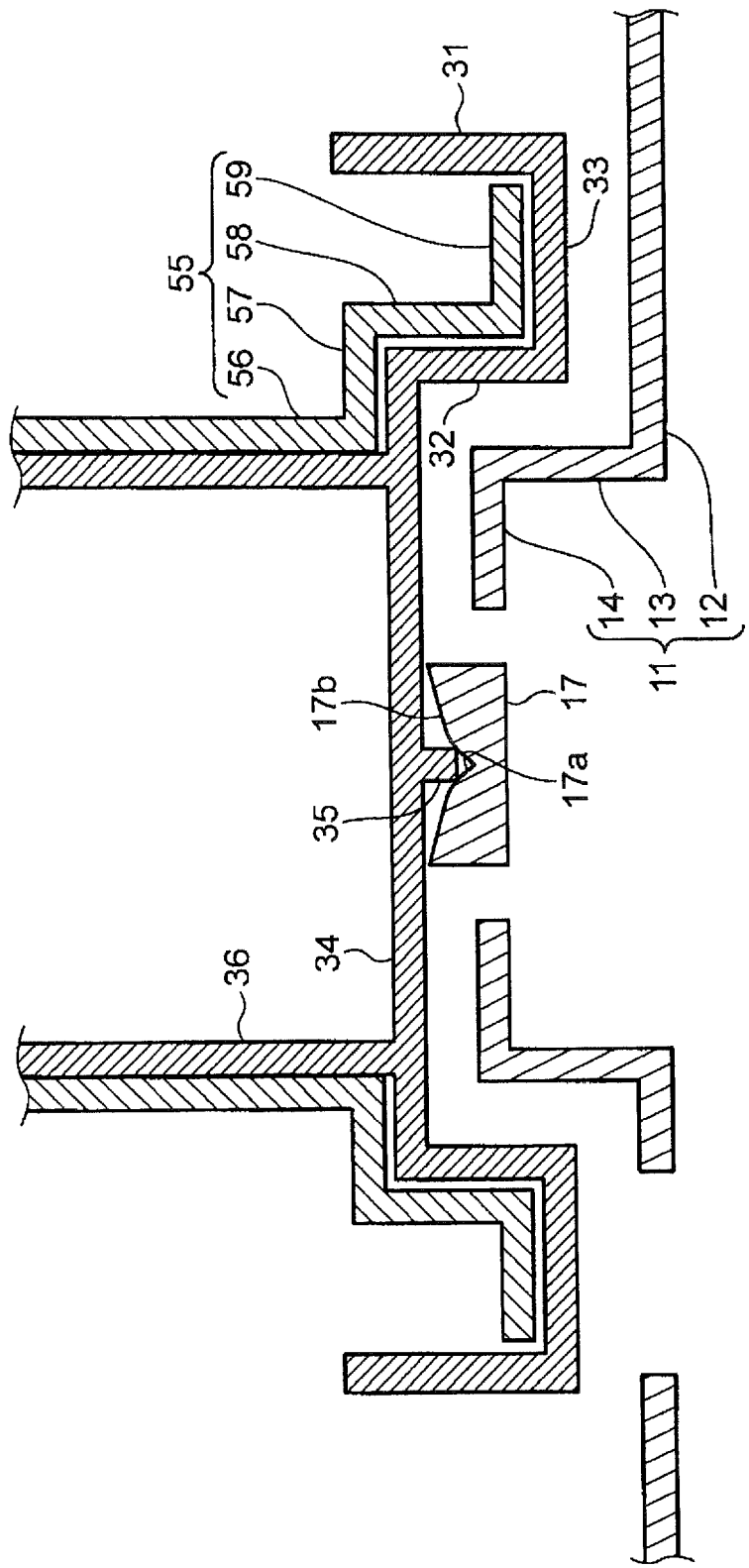
FIG. 4 is a cross-sectional view taken along line IV-IV in FIG. 3.
Figure 5:
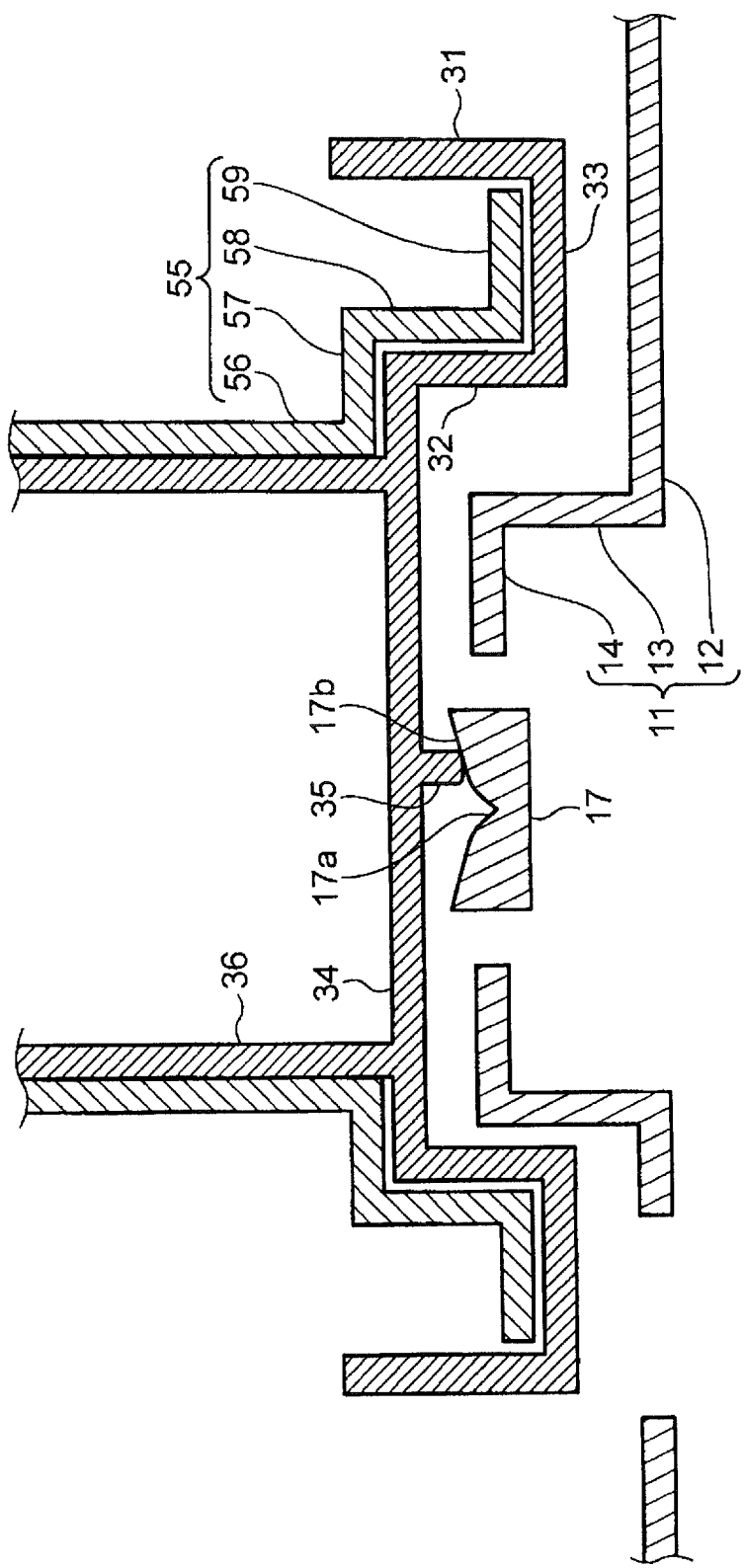
FIG. 5 is a cross-sectional view showing a relationship between a first engagement portion and a second engagement portion.

The second engagement portion 35 engages with the first engagement portion 17 included in the flexible portion 15, thereby retaining the operating member 50 in the neutral position. Also, when the operating member 50 is operated to slide, the second engagement portion 35 presses the first engagement portion 17 downward, thereby causing bending deformation of the flexible portion 15. Specifically, the second engagement portion 35 protrudes from the opposing wall 34 to the side of the upper wall 14 (lower side), and passes through the center of the opposing wall 34 and is elongated in the slide restriction direction. In this embodiment, the second engagement portion 35 includes a locked portion that is locked into the locking portion 17a of the first engagement portion 17. When no operating force in the sliding direction is applied to the operating member 50, the locked portion of the second engagement portion 35 is locked into the locking portion 17a, and therefore the operating member 50 and the slider 30 are retained in the neutral position (FIG. 4). Then, when the operating member 50 is operated in the sliding direction, the locked portion slides on the sliding surface 17b in the sliding direction and simultaneously presses the first engagement portion 17 to the side of the opposing surface 12a (lower side), thereby causing bending deformation of the flexible piece 16 (FIG. 5).

The attachment tube portion 36 has a cylindrical shape that is coaxial with the axis of rotation and is smaller than the inner tube portion 32. The attachment tube portion 36 extends upward from the opposing wall 34.

Figure 8:
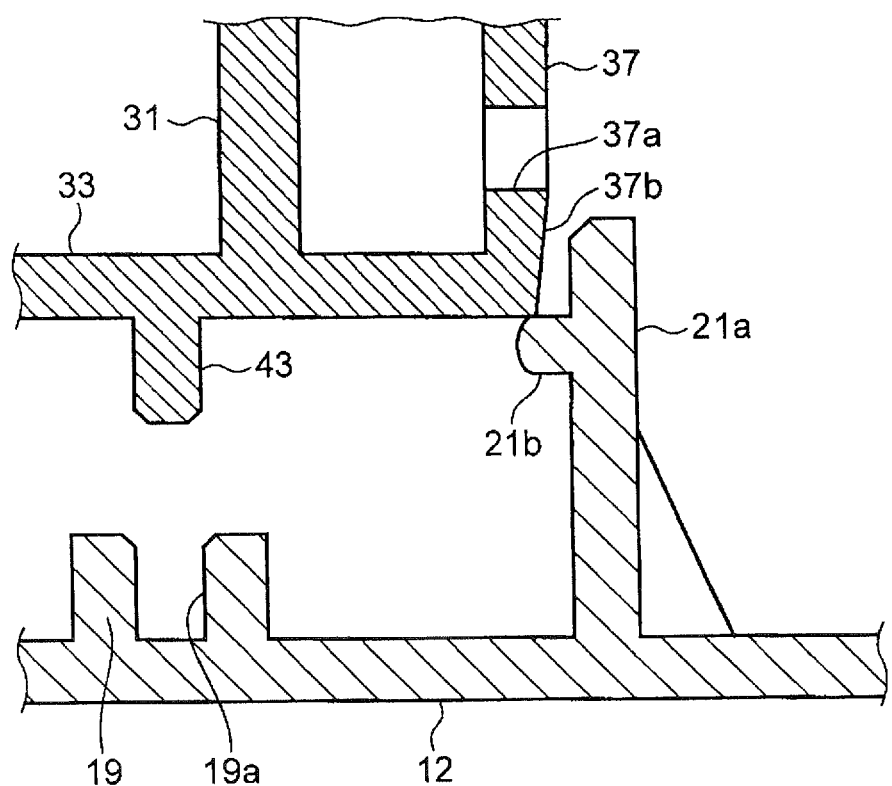
FIG. 8 is a diagram showing mounting of a slider to a base in the same cross section as in FIG. 2.
Figure 9:
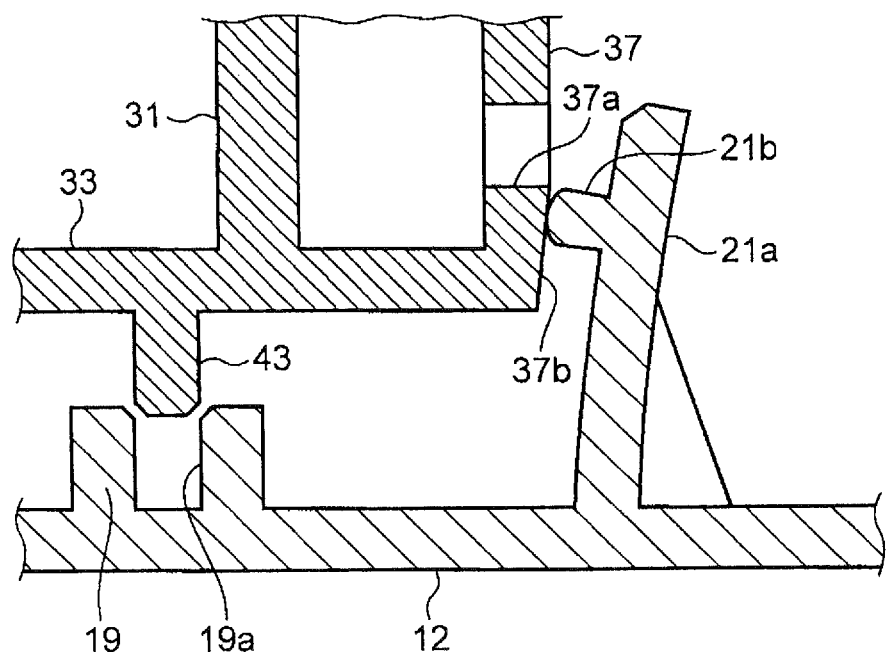
FIG. 9 is a diagram showing a state in which mounting of the slider to the base has proceeded from the state in FIG. 8.

The first restricted wall 37 is elongated in a direction parallel to the sliding direction. The first restricted wall 37 is in contact with the retaining portion 31 at a front end portion of the retaining portion 31. As shown in FIGS. 2, 3, and 7, the first restricted wall 37 has a first slot that can receive the first sliding contact portion 21b and that is elongated in the sliding direction. The slider 30 is capable of sliding in the sliding direction in a state in which the first sliding contact portion 21b is received in the first slot. That is, the dimension of the first slot in its lengthwise direction (left-right direction) is set to a dimension that allows sliding of the slider 30 in the left-right direction. An inner circumferential surface surrounding the first slot of the first restricted wall 37 has the first restricted surface 37a that comes into contact with a lower end of the first sliding contact portion 21b when the slider 30 is displaced in the direction away from the base 10. In other words, a lower surface of the inner circumferential surface surrounding the first slot of the first restricted wall 37 constitutes the first restricted surface 37a. As a result of the first restricted surface 37a coming into contact with the first sliding contact portion 21b, displacement of the slider 30 in the direction away from the base 10 is restricted. In addition, as shown in FIGS. 7 to 9, the first restricted wall 37 has a first inclined portion 37b that is formed in an outer surface of the first restricted wall 37 under the first slot. The first inclined portion 37b is formed in order to facilitate attachment of the slider 30 to the base 10. Specifically, the first inclined portion 37b of the first restricted wall 37 has a thickness (dimension in the front-rear direction) that gradually decreases from the first slot toward the lower end. These aspects also hold true on the side of the third restricting portion 23.

The second restricted wall 38 is elongated in the direction parallel to the sliding direction. The second restricted wall 38 is in contact with the retaining portion 31 at a rear end portion of the retaining portion 31. As shown in FIGS. 2 and 3, the second restricted wall 38 has a second slot that can receive the second sliding contact portion 22b, a second restricted surface 38a that comes into contact with the second sliding contact portion 22b, and a second inclined portion. The second slot, the second restricted surface 38a, and the second inclined portion of the second restricted wall 38 are plane-symmetrical to the first slot, the first restricted surface 37a, and the first inclined portion 37b of the first restricted wall 37, where the parallel plane is the plane of symmetry. This also holds true on the side of the fourth restricting portion 24.

The first transmission member pressing portion 39 is elongated in a direction parallel to the slide restriction direction, and connects a right end portion of the first restricted wall 37 to an outer circumferential surface of the retaining portion 31. The first transmission member pressing portion 39 is continuous with the outer circumferential surface of the retaining portion 31 at a location inward of the right end portion of the retaining portion 31, and also is perpendicular to the opposing surface 12a. When the operating member 50 is operated to slide to the right, the first transmission member pressing portion 39 presses the first transmission member 71 to the right. The second transmission member pressing portion 40 is plane-symmetrical to the first transmission member pressing portion 39, where the orthogonal plane is the plane of symmetry, and so a description of the second transmission member pressing portion 40 will be omitted.

The first abutment wall 41 is elongated in the direction parallel to the slide restriction direction, and connects a right end portion of the second restricted wall 38 to the outer circumferential surface of the retaining portion 31. The first abutment wall 41 is in contact with the retaining portion 31 at a right end portion of the retaining portion 31. The operating member 50 is allowed to slide to the right in the sliding direction until the first abutment wall 41 abuts against the first stopper portion 27. The second abutment wall 42 is plane-symmetrical to the first abutment wall 41, where the orthogonal plane is the plane of symmetry, and so a description of the second abutment wall 42 will be omitted.

The first guided portion 43 is shaped such that the first guided portion 43 can be removably fitted into the first guiding portion 19 in a direction parallel to the axis of rotation and can be guided in the sliding direction by the first guiding portion 19 in the fitted state (the state shown in FIG. 2). Specifically, the first guided portion 43 protrudes from the bottom wall 33 toward the opposing surface 12a (lower side) and is elongated in the sliding direction. In a state in which the first guided portion 43 is fitted into the first guiding portion 19, the first guided portion 43 is sandwiched by the outer rail portion and the inner rail portion of the first guiding portion 19 from both sides in the slide restriction direction and thus restricted so as not to be displaced in the slide restriction direction, but is allowed to slide in the sliding direction relative to these rail portions.

The second guided portion 44 is positioned symmetrically to the first guided portion 43 with respect to the parallel plane. In addition, as shown in FIG. 3, the second guided portion 44 is symmetrical to the first guided portion 43 with respect to the parallel plane except that its length in the sliding direction is larger than that of the first guided portion 43. Therefore, a description of the second guided portion 44 will be omitted.

Note that each of the inner rail portion of the first guiding portion 19 and the inner rail portion of the second guiding portion 20 can be omitted. In that case, an inner surface (first guiding surface) 19a of the outer rail portion of the first guiding portion 19 restricts the first guided portion 43 from outside with respect to the slide restriction direction, and an inner surface (second guiding surface) 20a of the outer rail portion of the second guiding portion 20 restricts the second guided portion 44 from outside with respect to the slide restriction direction. Alternatively, each of the outer rail portion of the first guiding portion 19 and the outer rail portion of the second guiding portion 20 can be omitted. In that case, an outer surface (first guiding surface) of the inner rail portion of the first guiding portion 19 restricts the first guided portion 43 from inside with respect to the slide restriction direction, and an outer surface (second guiding surface) of the inner rail portion of the second guiding portion 20 restricts the second guided portion 44 from inside with respect to the slide restriction direction.

The first clamp portion 45 has a shape that holds the first transmission member 71, more specifically, a pressed portion 71a, which will be described later, between the first clamp portion 45 and the first transmission member pressing portion 39 from both sides in the sliding direction. Specifically, the first clamp portion 45 has an opposing piece 45a that faces the first transmission member pressing portion 39 and is spaced apart from the first transmission member pressing portion 39 by a distance that is necessary for the pressed portion 71a to be held between the opposing piece 45a and the first transmission member pressing portion 39, as well as a connecting piece 45b that connects an upper end of the first transmission member pressing portion 39 to an upper end of the opposing piece 45a. The opposing piece 45a is perpendicular to the opposing surface 12a. The connecting piece 45b is parallel to the opposing surface 12a. The second clamp portion 46 is plane-symmetrical to the first clamp portion 45, where the orthogonal plane is the plane of symmetry, and so a description of the second clamp portion 46 will be omitted.

The operating member 50 is retained by the slider 30 so as to be rotatable about the axis of rotation, and also is operable to slide so that it slides in the sliding direction together with the slider 30. The operating member 50 has a dial 51 that is operable to rotate and to slide by an operator, and an inner member 55 that is connected to the dial 51 so as to simultaneously rotate with the dial 51. Note that although the dial 51 and the inner member 55 of this embodiment are composed of separate members, the dial 51 and the inner member 55 may also be formed as a single member. Moreover, the dial 51 may be omitted. In that case, it is preferable that the inner member 55 has a shape whose upper end is closed.

The dial 51 has a cylindrical gripped portion 52 to be gripped by the operator, a circular plate-shaped top wall 53 that closes an upper end of the gripped portion 52, and a inner member connecting portion 54 that is connected to the inner member. The gripped portion 52 is coaxial with the axis of rotation. The inner member connecting portion 54 has a cylindrical shape that is smaller than the gripped portion 52 and is coaxial with the axis of rotation. The inner member connecting portion 54 extends downward from a position on a lower surface of the top wall 53 that is located inward (on the side of the axis of rotation) of the gripped portion 52.

The inner member 55 has a tubular dial connecting portion 56 that is connected to the dial 51, a first projecting portion 57 projecting outward in a radial direction from the entire circumference of a lower end of the dial connecting portion 56, an outer tube portion 58 having a tubular shape extending downward from an outer edge of the first projecting portion 57, and a second projecting portion 59 projecting outward in the radial direction from a lower end of the outer tube portion 58. The dial connecting portion 56 is larger than the inner member connecting portion 54. The dial connecting portion 56 is connected to the inner member connecting portion 54 so as to be incapable of relative rotation with respect to the inner member connecting portion 54. The outer tube portion 58 has a larger diameter than the inner tube portion 32. The second projecting portion 59 fits between an inner surface of the retaining portion 31 and an outer surface of the inner tube portion 32 and is supported on the bottom wall 33.

The first detecting element 61 detects that the operating member 50 has been slid to a specific sliding operation position that is located on the right side in the sliding direction. The first detecting element 61 is fixed in the first hole 12b while being oriented in such a manner that it can detect displacement of the first transmission member 71 to the side of the opposing surface 12a (element pressing direction). In this embodiment, a tactile switch is used as the first detecting element 61. The second detecting element 62 detects that the operating member 50 has been slid to a specific sliding operation position that is located on the left side in the sliding direction. The second detecting element 62 is fixed in the second hole 12c while being oriented in such a manner that it can detect displacement of the second transmission member 72 in the element pressing direction. In this embodiment, a tactile switch of the same type as the first detecting element 61 is used as the second detecting element 62.

The first transmission member 71 has a pressed portion 71a that is pressed against by the first transmission member pressing portion 39, an element pressing portion 71b that presses the first detecting element 61 in the element pressing direction, and a pair of plate portions 71c facing each other in the slide restriction direction. The pressed portion 71a has a cylindrical shape with an axis extending in a direction (front-rear direction) parallel to the center shaft 25a of the first transmission member retaining portion 25. The pressed portion 71a is held between the first transmission member pressing portion 39 and the opposing piece 45a. The element pressing portion 71b has the same shape as the pressed portion 71a. The pressed portion 71a and the element pressing portion 71b are each disposed between the pair of plate portions 71c so as to connect the plate portions 71c to each other.

The pair of plate portions 71c each have a bearing hole 71d into which the center shaft 25a can be inserted. The bearing hole 71d is formed at a position in each of the pair of plate portions 71c that is spaced apart from a straight line connecting the pressed portion 71a and the element pressing portion 71b. In other words, the pressed portion 71a, the element pressing portion 71b, and the bearing hole 71d are arranged in a triangle. Thus, the first transmission member 71 can rotate about the central shaft 25a in a state in which it is retained by the first transmission member retaining portion 25.

Figure 6:
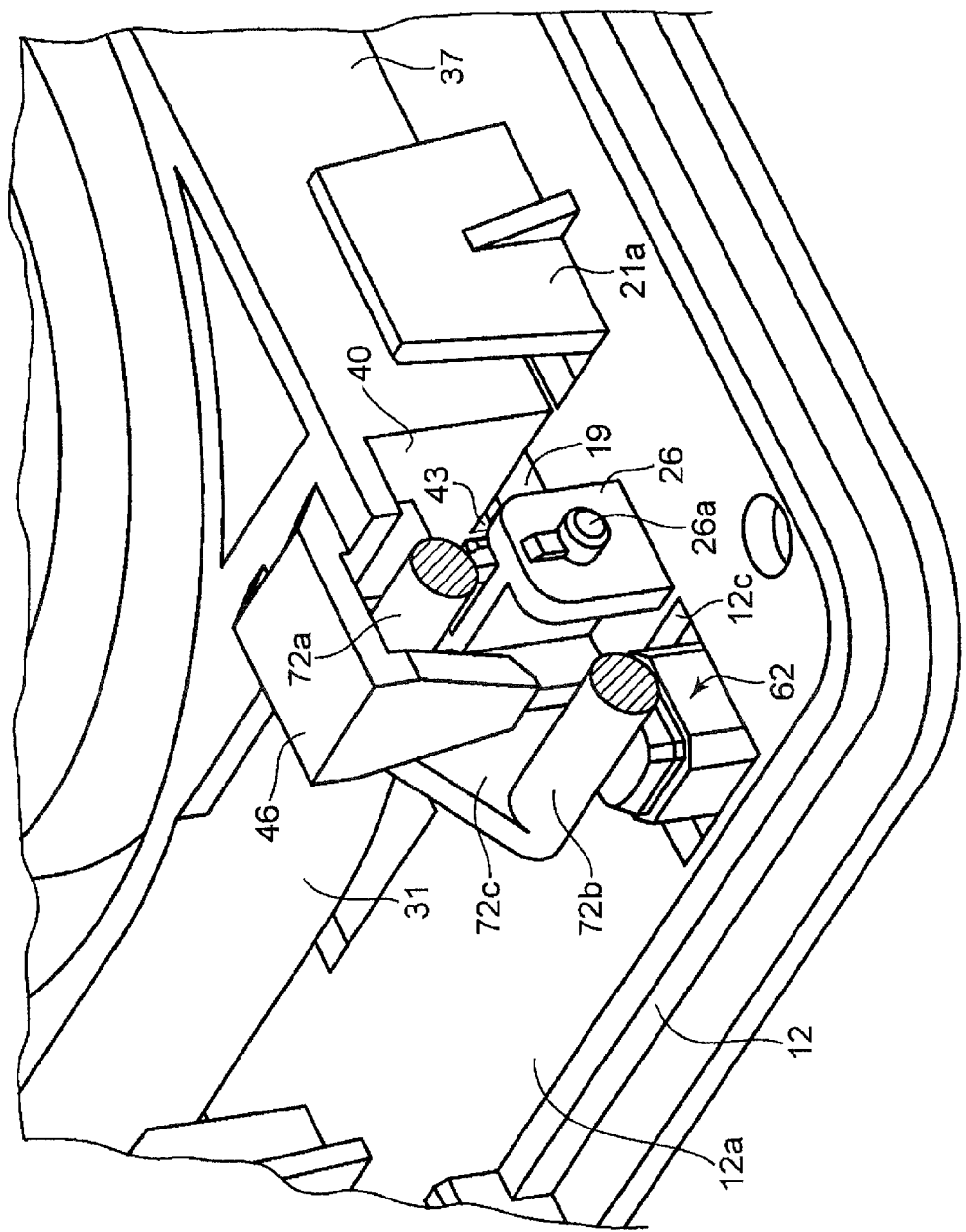
FIG. 6 is a partially cut-away perspective view of a transmission member.

Like the first transmission member 71, the second transmission member 72 has a pressed portion 72a, an element pressing portion 72b, and a pair of plate portions 72c each having a bearing hole 72d (see FIGS. 6 and 7). The second transmission member 72 is symmetrical to the first transmission member 71 with respect to the orthogonal plane, and so a description of the second transmission member 72 will be omitted.

The panel 80 exposes the dial 51 to the outside and covers the other members, namely, the base 10, the slider 30, the detecting elements 61 and 62, the transmission members 71 and 72, and the inner member 55. Specifically, the panel 80 has an opening having a diameter that is larger than the diameter of the dial connecting portion 56 and smaller than the diameter of the gripped portion 52. As shown in FIGS. 1 and 2, a lower end of the panel 80 is attached to the base 10.

Next, an assembly process of the composite operating device of this embodiment will be described.

First, the base 10 is prepared. The first detecting element 61 is fixed in the first hole 12b of the base 10, and the second detecting element 62 is fixed in the second hole 12c.

Then, the first transmission member 71 is attached to the first transmission member retaining portion 25, and the second transmission member 72 is attached to the second transmission member retaining portion 26. Specifically, the first transmission member 71 is attached to the first transmission member retaining portion 25 so that the center shaft 25a of the first transmission member retaining portion 25 is inserted into the bearing holes 71d of the first transmission member 71. Similarly, the second transmission member 72 is attached to the second transmission member retaining portion 26 so that the center shaft 26a of the second transmission member retaining portion 26 is inserted into the bearing holes 72d of the second transmission member 72.

Subsequently, the slider 30 is mounted to the base 10. Specifically, the slider 30 is brought near to the base 10 while being oriented in such a manner that the second engagement portion 35 faces the first engagement portion 17 and the guided portions 43 and 44 face the respective guiding portions 19 and 20. At this time, the first guided portion 43 approaches a fitting direction in which it is fitted into the first guiding portion 19. In the process until the first guided portion 43 is fitted into the first guiding portion 19, the lower end of the first restricted wall 37 comes into contact with an upper end of the first sliding contact portion 21b (see FIG. 8). Note that since the second guided portion 44 behaves in the same manner as the first guided portion 43 and the second to fourth restricting portions 22 to 24 behave in the same manner as the first restricting portion 21, a description here will be given taking the side of the first guided portion 43 and the first restricting portion 21 as an example. From this state (the state in FIG. 8), when the slider 30 is brought nearer to the base 10 in the fitting direction, the first upright protruding piece 21a is deformed to bend so as to allow outward displacement of the first sliding contact portion 21b in the slide restriction direction (FIG. 9). At this time, the first sliding contact portion 21b slides on the outer surface of the first inclined portion 37b.

Then, when the first guided portion 43 is fitted into the first guiding portion 19, the first sliding contact portion 21b is inserted into the first slot and abuts against the first restricted surface 37a. At this time, that is, when mounting of the slider 30 to the base 10 is finished, the second engagement portion 35 engages with the first engagement portion 17, so that the slider 30 is retained in the neutral position. In other words, since the base 10 has the flexible portion 15 including the first engagement portion 17, and the slider 30 has the second engagement portion 35, a structure that retains the operating member 50 in the neutral position is constructed by a simple process of mounting the slider 30 to the base 10. At the same time, the first clamp portion 45 holds the pressed portion 71a from both sides, and the second clamp portion 46 holds the pressed portion 72a from both sides.

Then, the inner member 55 is mounted to the slider 30. Specifically, the inner member 55 is brought near to the slider 30 so that the dial connecting portion 56 is externally fitted to the attachment tube portion 36. Then, the second projecting portion 59 is received on the bottom wall 33, and thus mounting of the inner member 55 to the slider 30 is finished.

Note that mounting of the inner member 55 to the slider 30 may be performed simultaneously with mounting of the slider 30 to the base 10, or may be performed prior to mounting of the slider 30 to the base 10.

Subsequently, the panel 80 is fixed to the base 10 so that an upper portion of the inner member 55 is exposed through the opening of the panel 80.

Finally, the dial 51 is mounted to the inner member 55 in such a manner that the inner member connecting portion 54 is internally fitted to the dial connecting portion 56.

The composite operating device of this embodiment is assembled by the foregoing process.

Next, operations of the composite operating device when the operating member 50 is operated to slide and when it is operated to rotate will be described in this order.

As shown in FIG. 4, when no operating force in the sliding direction is applied to the operating member 50, the operating member 50 is retained in the neutral position by the locking portion 17a of the flexible portion 15 locking the locked portion of the second engagement portion 35.

When the operating member 50 is operated to slide from the neutral position to, for example, the left in the sliding direction, the slider 30 also slides in the same direction. At this time, as shown in FIG. 5, the locked portion of the second engagement portion 35 leaves the locking portion 17a and presses the sliding surface 17b downward. Thus, the displacement end portion of the flexible piece 16 is deformed to bend downward. That is, the bending deformation of the flexible piece 16 allows the locked portion to leave the locked position in which it is locked by the locking portion 17a, that is, the neutral position and slide to the left. Also, an elastic returning force associated with the bending deformation gives the operating member 50 a biasing force that acts in a direction (rightward direction) in which the operating member 50 is returned to the neutral position. The biasing force increases with the amount of displacement of the operating member 50 in the sliding direction. Specifically, since the sliding surface 17b linearly extends gradually upward from the locking portion 17a toward the outer sides in the sliding direction, the larger the amount of displacement of the operating member 50 (the second engagement portion 35) in the sliding direction, the larger the amount of downward displacement of the displacement end portion of the flexible piece 16. Accordingly, the larger the amount of displacement of the operating member 50 (the second engagement portion 35) in the sliding direction, the larger the elastic returning force associated with the bending deformation of the flexible piece 16, that is, the biasing force that acts in the direction in which the operating member 50 is returned to the neutral position.

At this time, as shown in FIG. 7, the pressed portion 72a of the second transmission member 72 is pressed to the left by the second transmission member pressing portion 40. Thus, the second transmission member 72 rotates counterclockwise about the center shaft 26a. This causes the element pressing portion 72b to be displaced in the element pressing direction, and the second detecting element 62 is pressed against by the element pressing portion 72b, so that the leftward sliding operation of the operating member 50 is detected. In addition, at this time, the pressed portion 71a of the first transmission member 71 is pressed to the left by the first clamp portion 45 (the opposing piece 45a). Thus, the first transmission member 71 rotates counterclockwise about the center shaft 25a. Moreover, during the sliding operation, the first guided portion 43 is guided by the first guiding portion 19, and the second guided portion 44 is guided by the second guiding portion 20, so that displacement of the operating member 50 and the slider 30 in the slide restriction direction is restricted. Furthermore, during the sliding operation, the sliding contact portions of the restricting portions 21 to 24 abut against the respective restricted surfaces from the upper side, thereby restricting upward displacement of the slider 30.

From this state, that is, the state in which the operating member 50 has been slid to the left, when the sliding operating force acting on the operating member 50 in the leftward direction is removed, an elastic returning force of the flexible piece 16, that is, a biasing force that acts on the second engagement portion 35 in the rightward direction via the first engagement portion 17 reliably returns the operating member 50, and the slider 30, to the neutral position. The foregoing description also applies to the case where the operating member 50 is operated to slide to the right in the sliding direction.

Next, when the operating member 50 in the neutral position is operated to rotate, the inner member 55 rotates about the axis of rotation inside the retaining portion 31. At this time, the second projecting portion 59 presses against a rotation detecting element (a unit switch capable of detecting normal and reverse rotations of the operating member 50), which is not shown, so that the rotating operation of the operating member 50 is detected. During the rotating operation, engagement between the first engagement portion 17 and the second engagement portion 35 reliably retains the operating member 50 in the neutral position, and thus displacement of the operating member 50 in the sliding direction during the rotating operation is effectively suppressed. Therefore, degradation of the operating feel and output of an unintended signal due to the displacement are suppressed.

As described above, with the composite operating device of this embodiment, a structure is constructed which retains the operating member 50 in the neutral position by engagement between the first engagement portion 17 of the base 10 and the second engagement portion 35 of the slider 30 and allows the operating member 50 to slide by bending deformation of the flexible portion 15. Thus, the number of components is reduced, and the assembly process is simplified. Specifically, the base 10 includes the flexible portion 15 that is capable of elastic bending deformation in the vertical direction relative to the slider 30, the flexible portion 15 has the first engagement portion 17 that engages with the second engagement portion 35 of the slider 30, and the slider 30 has the second engagement portion 35 that engages with the first engagement portion 17. Accordingly, a structure is constructed in which when no operating force in the sliding direction is applied to the operating member 50, the operating member 50 is retained in the neutral position by the engagement between the locking portion 17a of the first engagement portion 17 and the locked portion of the second engagement portion 35, and when an operating force in the sliding direction is applied to the operating member 50, the flexible piece 16 is deformed to bend so as to allow downward displacement of the first engagement portion 17 that is pressed against by the second engagement portion 35, thereby allowing sliding of the operating member 50 while providing a resistance that acts to retain the operating member 50 in the neutral position.

Moreover, the flexible portion 15 of this embodiment includes the flexible piece 16 extending from the base main body 11 in the front-rear direction and being capable of elastic deformation so as to allow displacement of its displacement end portion in the vertical direction. The first engagement portion 17 having a shape that gradually increases in vertical dimension from the neutral position toward both of the outer sides in the sliding direction. Accordingly, when the operating member 50 is operated in the sliding direction and the flexible piece 16 is elastically deformed, the first engagement portion 17 exerts on the second engagement portion 35 resistance forces generated by the flexible piece 16 behaving to cancel the elastic deformation, that is, a resistance force generated by the flexible piece 16 behaving to cancel the vertical displacement of the first engagement portion 17 (i.e., bending deformation of the flexible piece 16) and a resistance force generated by the flexible piece 16 behaving to cancel displacement of the first engagement portion 17 around an intersecting axis coinciding with a straight line, of straight lines parallel to the front-rear direction, that traverses the flexible portion 15 and that intersects the axis of rotation (i.e., torsional deformation of the flexible piece 16). Thus, the operating member 50 is more reliably retained in the neutral position.

Furthermore, the flexible piece 16 of this embodiment is in the form of a cantilever having the base end portion that is continuous with the base main body 11 and the displacement end portion that is an end portion on the side that is opposite to the base end portion and constitutes a free end, and the first engagement portion 17 is formed in the displacement end portion. Thus, it is easy to adjust the amount of displacement of the displacement end portion, or in other words, a retaining force that retains the operating member 50 in the neutral position.

Moreover, in this embodiment, a structure in which the operating member 50 and the slider 30 are reliably guided in the sliding direction by the guiding portions 19 and 20 of the base 10 and the guided portions 43 and 44 of the slider 30 as well as a structure in which disengagement of the slider 30 is prevented by the restricting portions 21 to 24 of the base 10 coming into contact with the respective restricted surfaces of the slider 30 are simultaneously constructed by mounting the slider 30 to the base 10 in the fitting direction. Specifically, the slider 30 has the first guided portion 43 and the second guided portion 44 that are shaped such that these guided portions can be removably fitted into the first guiding portion 19 and the second guiding portion 20, respectively, in the direction parallel to the axis of rotation and can be guided in the sliding direction by the respective guiding portions 19 and 20 in the fitted state. The first guiding portion 19 is elongated in the direction parallel to the sliding direction and has the first guiding surface 19a that, in the fitted state, restricts the first guided portion 43 from a first side (front side) with respect to the slide restriction direction. The second guiding portion 20 is elongated in the direction parallel to the sliding direction and has the second guiding surface 20a that, in the fitted state, restricts the second guided portion 44 from the side (rear side) that is opposite to the first side with respect to the slide restriction direction. Thus, a structure in which the operating member 50 and the slider 30 are reliably guided in the sliding direction without being displaced in the slide restriction direction relative to the base 10 is constructed by mounting the slider 30 to the base 10 so that the guiding portions 19 and 20 are fitted to the respective guided portions 43 and 44. In addition, the slider 30 has the restricted surfaces that face the side (upper side) that is opposite to the opposing surface 12a of the base 10, extend parallel to the sliding direction, and are restricted by the corresponding restricting portions 21 to 24. Each of the restricting portions 21 to 24 for the slider 30 has the sliding contact portion that, in the fitted state, comes into contact with the corresponding restricted surface from the upper side, thereby restricting the slider 30, and comes into sliding contact with the restricted surface in the sliding direction, thereby allowing the slider 30 to slide. Also, each of the restricting portions 21 to 24 is shaped such that as the slider 30 approaches the opposing surface 12a in the fitting direction in the process until the guided portions 43 and 44 are fitted into the respective guiding portions 19 and 20, the restricting portion comes into contact with the slider 30 and is thus deformed to bend in a direction in which it is retracted from the slider 30, thereby allowing the slider 30 to move in the fitting direction. Thus, a structure in which disengagement of the slider 30 is prevented by the restricting portions 21 to 24 coming into contact with the respective restricted surfaces is constructed by mounting the slider 30 to the base 10 so that the guiding portions 19 and 20 are fitted to the respective guided portions 43 and 44.

Moreover, with the composite operating device, the first restricting portion 21 and the second restricting portion 22 restrict the slider 30 from opposite sides of the two guiding portions 19 and 20 with respect to the slide restriction direction. Thus, disengagement of the slider 30 in the fitted state is even more reliably prevented.

Furthermore, with the composite operating device, the first restricting portion 21 and the third restricting portion 23 are plane-symmetrical to each other, where the orthogonal plane is the plane of symmetry, and the second restricting portion 22 and the fourth restricting portion 24 are plane-symmetrical to each other, where the orthogonal plane is the plane of symmetry. Thus, rotation of the slider 30 about a straight line, of straight lines in the orthogonal plane and parallel to the slide restriction direction, that passes through the slider 30 is suppressed. Accordingly, rattling of the operating member 50 and the slider 30 during sliding is suppressed.

Moreover, in the above-described embodiment, the first restricted wall 37 is elongated in the sliding direction so as to include one of the tangents to the retaining portion 31 that extend in the direction parallel to the sliding direction. Also, the second restricted wall 38 is elongated in the sliding direction so as to include the other of the tangents to the retaining portion 31 that extend in the direction parallel to the sliding direction. Thus, the dimension between the first restricted wall 37 and the second restricted wall 38 is approximately equal to the diameter of the retaining portion 31, that is, the minimum dimension that is required to rotatably retain the operating member 50. Accordingly, the dimension of the slider 30 in the slide restriction direction can be minimized.

Moreover, the sliding contact portions are in line contact with the corresponding restricted surfaces. Thus, frictional forces that act between the sliding contact portions and the respective restricted surfaces are reduced. Accordingly, operating resistance during a sliding operation of the operating member 50 is reduced.

Moreover, in this embodiment, displacement of the slider 30 in the sliding direction is converted into displacement of the transmission members 71 and 72 in the element pressing direction. This displacement is used to press against the detecting elements 61 and 62. Thus, the required overall dimension of the composite operating device in the sliding direction is reduced. Specifically, the first transmission member 71 is retained by the first transmission member retaining portion 25 so that displacement of the slider 30 in the sliding direction is converted into displacement of the first transmission member 71 in the vertical direction, and the first detecting element 61 is fixed to the base 10 while being oriented in such a manner that it can detect displacement of the first transmission member 71 in the vertical direction. Thus, the required overall dimension in the sliding direction that is necessary for detection of displacement of the slider 30 in the sliding direction is reduced. This also holds true on the side of the second transmission member 72 and the second detecting element 62.

Moreover, the transmission member pressing portions 39 and 40 are formed within a region that is sandwiched by a pair of straight lines passing through the two ends of the retaining portion 31 in the slide restriction direction and extending in the direction parallel to the sliding direction. Thus, it is possible to reduce the dimension of the slider 30 in the sliding direction without increasing the dimension of the slider 30 in the slide restriction direction.

Furthermore, the transmission member pressing portions 39 and 40 are formed within a region that is sandwiched by a pair of straight lines passing through the two ends of the retaining portion 31 in the sliding direction and extending in the direction parallel to the slide restriction direction. Thus, the required overall dimension of the composite operating device in the sliding direction is reduced even more.

Additionally, the pressed portion 71a of the first transmission member 71 has a cylindrical shape with an axis extending in the direction parallel to the center shaft 25a. The slider 30 has the first clamp portion 45 that holds the pressed portion 71a between the first clamp portion 45 and the first transmission member pressing portion 39 from both sides in the sliding direction. Thus, whenever the slider 30 slides, the first transmission member 71 rotates about the center shaft 25a in conjunction with sliding of the slider 30. Accordingly, the occurrence of a malfunction such as rattling of the first transmission member 71 with respect to the slider 30 is suppressed. Furthermore, when the slider 30 returns to the neutral position from a state in which the first detecting element 61 is pressed against by the first transmission member 71, the element pressing portion 71b of the first transmission member 71 returns to a position in which it is not pressed against the first detecting element 61. Thus, the occurrence of a malfunction, for example, a situation in which even though the slider 30 is located in the neutral position, the first detecting element 61 continues to be pressed against by the first transmission member 71 is suppressed. This also holds true on the side of the second transmission member 72 and the second detecting element 62.

Second Embodiment

A second embodiment will be described with reference to FIGS. 10 to 12. Note that in the second embodiment, a description will be given only of portions that are different from the first embodiment, and a description of the same structures and effects as those of the first embodiment will be omitted. A composite operating device of the second embodiment is different from the composite operating device of the first embodiment with respect to the shapes of the slits 14a and the flexible portion.

Figure 10:
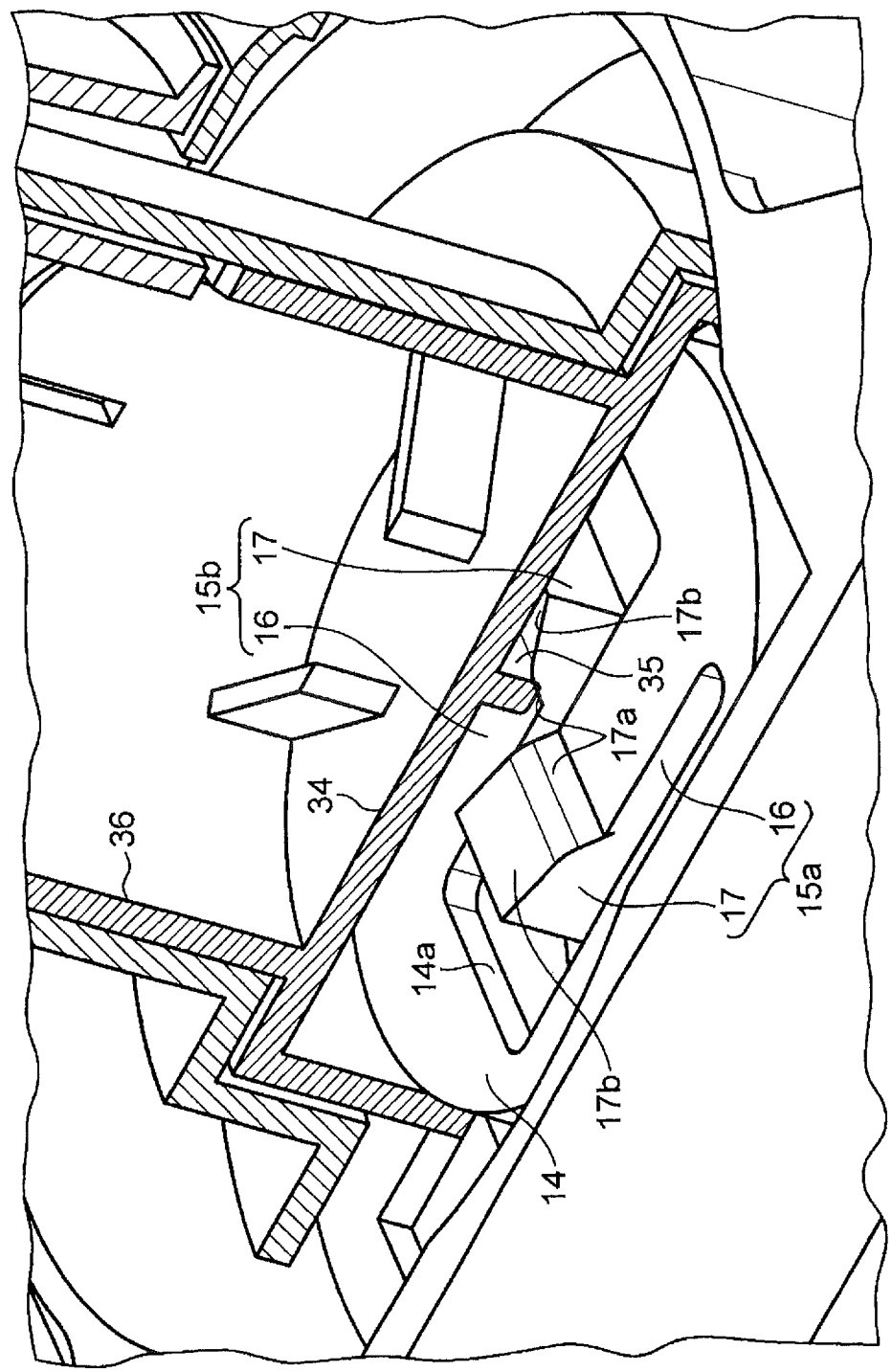
FIG. 10 is an enlarged perspective view showing the vicinity of a first engagement portion and a second engagement portion of a composite operating device according to a second embodiment.

As shown in FIG. 10, the slits 14a of this embodiment include a first slit that is elongated in the direction parallel to the left-right direction and is formed forward of the parallel plane, a second slit that is parallel to the first slit and is located so as to contain the parallel plane, a third slit (not shown) that is parallel to the second slit and is formed rearward of the parallel plane, a first connecting slit that connects a left end portion of the first slit to a left end portion of the second slit, and a second connecting slit that connects a right end portion of the second slit to a right end portion of the third slit. Each of the first, second, and third slits is symmetrical to the orthogonal plane. The first connecting slit is formed leftward of the orthogonal plane, and the second connecting slit is formed rightward of the orthogonal plane. That is, the flexible portion has a cantilevered first flexible portion 15a that is continuous with the upper wall 14 at its right end and constitutes a free end at its left end, as well as a cantilevered second flexible portion 15b that is continuous with the upper wall 14 at its left end and constitutes a free end at its right end.

The first flexible portion 15a has a flexible piece 16 having a base end portion, which is a right end portion and is continuous with the upper wall 14, and a displacement end portion, which is a left end portion and is capable of vertical displacement, as well as a front-side first engagement portion 17 formed in the displacement end portion of the flexible piece 16. The front-side first engagement portion 17 has a shape that gradually increases in vertical dimension from the center toward the left side in the sliding direction.

The second flexible portion 15b has a flexible piece 16 having a base end portion, which is a left end portion and is continuous with the upper wall 14, and a displacement end portion, which is a right end portion and is capable of vertical displacement, as well as a rear-side first engagement portion 17 formed in the displacement end portion of the flexible piece 16. The rear-side first engagement portion 17 has a shape that gradually increases in vertical dimension from the center toward the right side in the sliding direction.

The second engagement portion 35 is sandwiched between the front-side first engagement portion 17 and the rear-side first engagement portion 17 and is thus retained in the neutral position. That is, a part of the front-side first engagement portion 17 that abuts against the second engagement portion 35 from the left side and a part of the rear-side first engagement portion 17 that abuts against the second engagement portion 35 from the right side constitute the locking portion 17a. Additionally, the front-side first engagement portion 17 has a sliding surface 17b having a shape that continuously extends leftward from that part abutting against the second engagement portion 35, while the rear-side first engagement portion 17 has a sliding surface 17b having a shape that continuously extends rightward from that part abutting against the second engagement portion 35.

Figure 11:
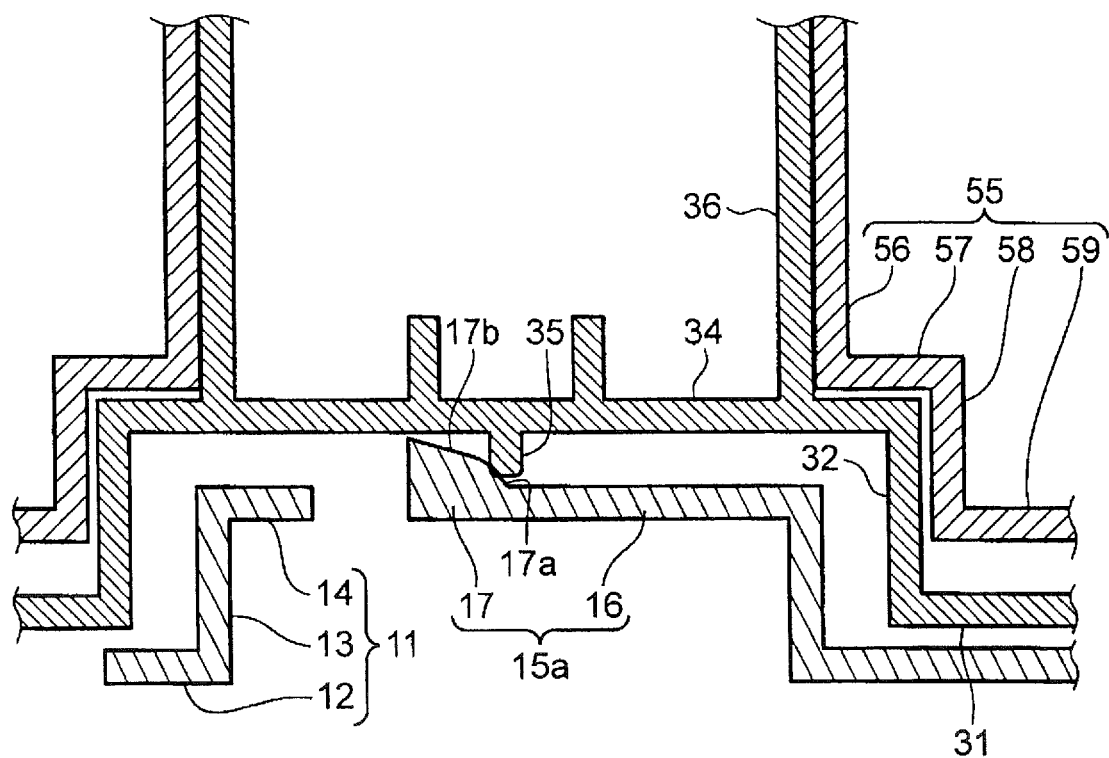
FIG. 11 is a cross-sectional view showing a relationship between the first engagement portion and the second engagement portion according to the second embodiment.
Figure 12:
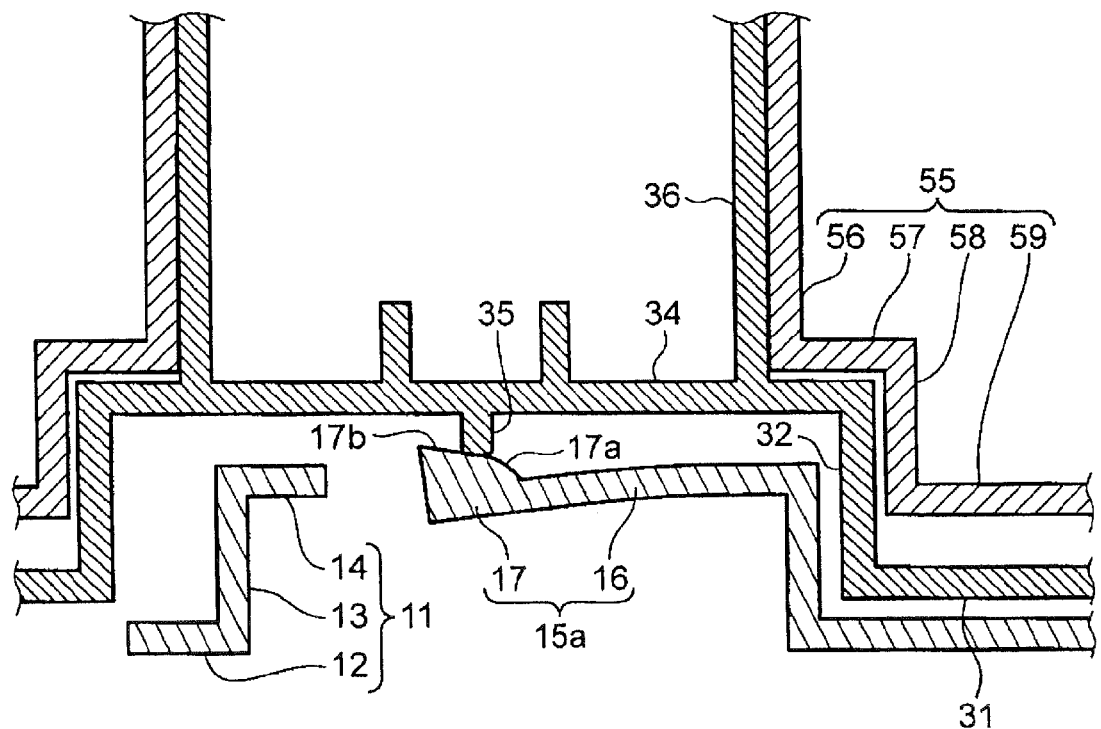
FIG. 12 is a cross-sectional view showing a relationship between the first engagement portion and the second engagement portion according to the second embodiment.

With the composite operating device of the second embodiment, when no operating force in the sliding direction is applied to the operating member 50, the locked portion of the second engagement portion 35 is locked into the locking portion 17a, and thus the operating member 50 is retained in the neutral position (see FIG. 11). When an operating force in, for example, the leftward direction is applied to the operating member 50, the second engagement portion 35 leaves the locking portion 17a and causes elastic downward deformation of the displacement end portion of the flexible piece 16 while sliding on the sliding surface 17b of the front-side first engagement portion 17 (see FIG. 12).

Third Embodiment

A third embodiment will be described with reference to FIGS. 13 to 15. Note that also in the third embodiment, a description will be given only of portions that are different from the first embodiment, and a description of the same structures and effects as those of the first embodiment will be omitted. A composite operating device of the third embodiment is different from the composite operating device of the first embodiment with respect to the shapes of the slits 14a, the flexible portion, the opposing wall 34, and the second engagement portion 35.

Figure 13:
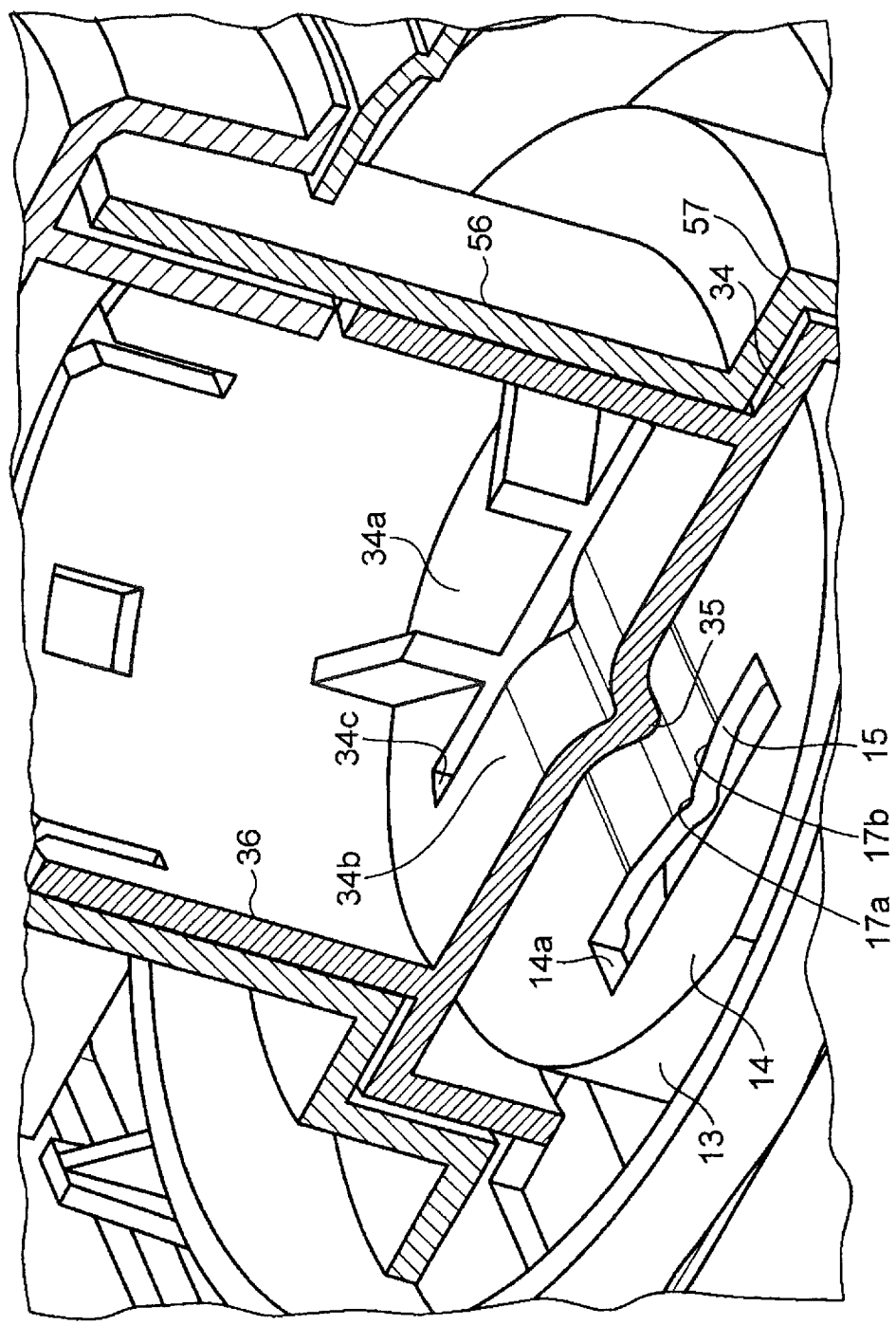
FIG. 13 is an enlarged perspective view showing the vicinity of a first engagement portion and a second engagement portion of a composite operating device according to a third embodiment.

As shown in FIG. 13, the slits 14a of this embodiment include a first slit that has a shape elongated in the direction parallel to the left-right direction and is formed forward of the parallel plane, and a second slit (not shown) that is parallel to the first slit and is formed rearward of the parallel plane. Each of the first and second slits has a symmetrical shape with respect to the orthogonal plane. That is, the flexible portion of this embodiment is formed in the shape of a double-supported beam that is continuous with the upper wall 14 at both of the left and right ends (hereinafter this flexible portion will be referred to as a "first flexible portion 15").

The first flexible portion 15 includes a locking portion 17a that is formed in the center of the first flexible portion 15 in the left-right direction and a sliding surface 17b that continuously extends from the locking portion 17a toward the outer sides in the left-right direction.

Slits 34c are formed in the opposing wall 34. The slits 34c include a first slit (not shown) that has a shape elongated in the direction parallel to the left-right direction and is formed forward of the parallel plane, and a second slit that is parallel to the first slit and is formed rearward of the parallel plane. Thus, the opposing wall 34 is divided into an opposing wall main body 34a and a second flexible portion 34b having the shape of a double-supported beam that is continuous with the opposing wall main body 34a at both of the left and right ends. The second flexible portion 34b includes the second engagement portion 35 that is formed in the center of the second flexible portion 34b in the left-right direction. The second flexible portion 34b is capable of bending deformation so as to allow the second engagement portion 35 to be displaced in the vertical direction relative to the opposing wall main body 34a.

Figure 14:
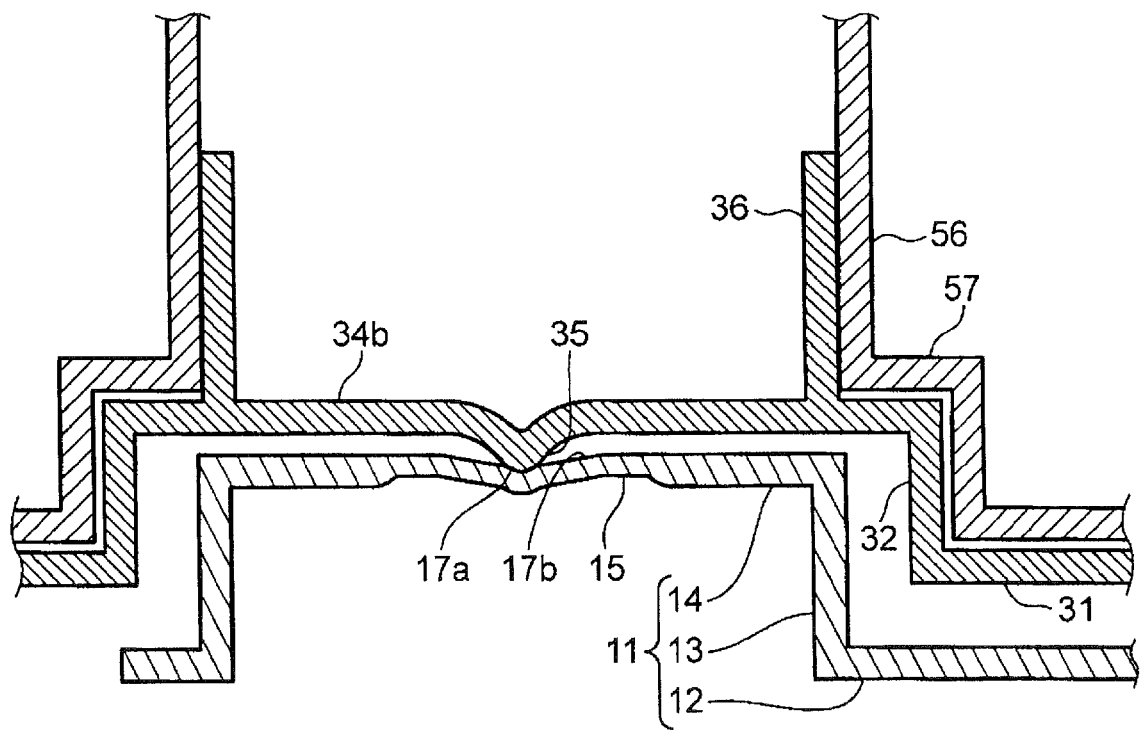
FIG. 14 is a cross-sectional view showing a relationship between the first engagement portion and the second engagement portion according to the third embodiment.
Figure 15:
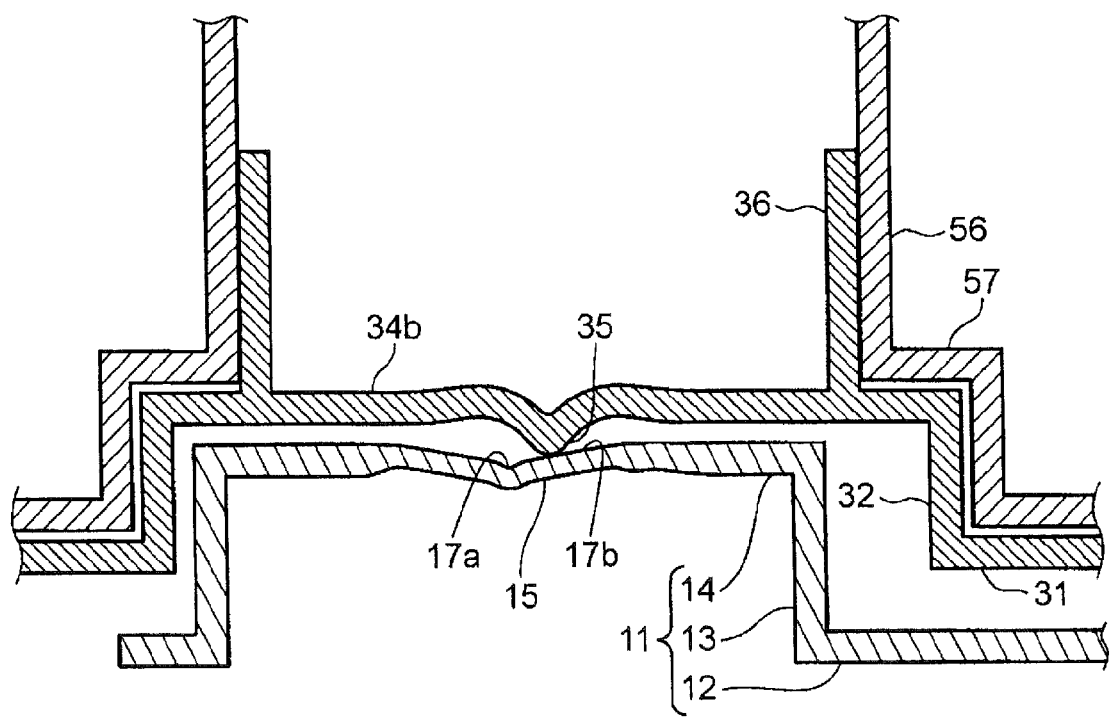
FIG. 15 is a cross-sectional view showing a relationship between the first engagement portion and the second engagement portion according to the third embodiment.

With the composite operating device of the third embodiment, when no operating force in the sliding direction is applied to the operating member 50, the locked portion of the second engagement portion 35 is locked into the locking portion 17a, and thus the operating member 50 is retained in the neutral position (see FIG. 14). Then, when an operating force in, for example, the rightward direction is applied to the operating member 50, the second engagement portion 35 leaves the locking portion 17a and causes elastic downward deformation of the first flexible portion 15 while sliding on the sliding surface 17b of the first flexible portion 15. At this time, the second engagement portion 35 receives a reaction force acting in the upward direction from the first flexible portion 15. Thus, the second flexible portion 34b is deformed to bend so as to allow upward displacement of the second engagement portion 35 (see FIG. 15)

Note that the embodiments disclosed herein are to be considered in all respects as illustrative and not restrictive. The scope of the invention is indicated by the appended claims rather than by the foregoing description of the embodiments, and all changes that come within the meaning and range of equivalency of the claims are intended to be embraced therein.

For example, in the first and second embodiments, examples in which the base 10 has a flexible portion that can be displaced in the vertical direction relative to the slider 30 have been described. However, the slider 30 may have a flexible portion that can be displaced in the vertical direction relative to the base 10. Note that as described in the third embodiment, it is also possible that both of the base 10 and the slider 30 have respective flexible portions.

Moreover, in the first embodiment, an example in which the first engagement portion 17 has a shape that gradually increases in vertical dimension from the center toward both of the left and right outer sides in the sliding direction, while the second engagement portion 35 has a shape that protrudes downward from the opposing wall 34 and is elongated in the front-rear direction has been described. However, it is also possible that the first engagement portion 17 has a shape that protrudes upward from the flexible piece 16 and is elongated in the front-rear direction, while the second engagement portion 35 has a shape that gradually increases in vertical dimension from the center toward both of the left and right outer sides in the sliding direction.

Moreover, with regard to the second embodiment, it is also possible that, for example, the second flexible portion 15b is omitted, and the first flexible portion 15a has the front-side first engagement portion 17 and the rear-side first engagement portion 17. In this case, the shapes of the two first engagement portions are set in such a manner that irrespective of whether the operating member 50 is slid to the left or to the right in the sliding direction, the operating feel is the same. Specifically, the angle of inclination of the sliding surface 17b with respect to the flexible piece 16 in the first engagement portion that is formed on the displacement end portion side of the flexible piece 16 is set to be larger than the angle of inclination of the sliding surface 17b with respect to the flexible piece 16 in the first engagement portion that is formed on the base end portion side of the flexible piece 16.

What is claimed is:
1. A composite operating device comprising:
an operating member that is operable to rotate about a specific axis of rotation and operable to slide in a direction orthogonal to the axis of rotation;
a slider that rotatably retains the operating member and slides in a direction parallel to a sliding direction of the operating member in conjunction with a sliding operation of the operating member; and
a base that retains the slider so as to allow the slider to slide in the sliding direction,
wherein:
the base comprises a flexible portion and at least one slit, the flexible portion being capable of elastic bending deformation in a predetermined direction relative to the base main body and comprising a first engagement portion that engages with the slider, the at least one slit configured to allow bending deformation of the flexible portion in a first direction that is parallel to the axis of rotation of the operating member,
the slider comprises a second engagement portion that engages with the first engagement portion in a state in which no operating force in the sliding direction is applied to the operating member, thereby retaining the slider in a neutral position in which the slider is not displaced in the sliding direction, the second engagement portion being shaped such that when an operating force in the sliding direction is applied to the operating member, the second engagement portion presses against the first engagement portion while being displaced in the sliding direction relative to the first engagement portion and causes the bending deformation of the flexible portion, the first engagement portion and the second engagement portion are shaped such that an amount of deformation of the flexible portion increases with an amount of operation of the operating member in the sliding direction, and the first engagement portion has a dimension that gradually increases in the first direction from the neutral position toward an outer side in the sliding direction.

2. A composite operating device comprising:

an operating member that is operable to rotate about a specific axis of rotation and operable to slide in a direction orthogonal to the axis of rotation;

a slider that rotatably retains the operating member and slides in a direction parallel to a sliding direction of the operating member in conjunction with a sliding operation of the operating member; and a base that retains the slider so as to allow the slider to slide in the sliding direction, wherein:

one of the base and the slider comprises a flexible portion and at least one slit, the flexible portion being capable of elastic bending deformation in a predetermined direction and comprising a first engagement portion that engages with the other of the base and the slider, the at least one slit configured to allow bending deformation of the flexible portion in a first direction that is parallel to the axis of rotation of the operating member, the other of the base and the slider comprises a second engagement portion that engages with the first engagement portion in a state in which no operating force in the sliding direction is applied to the operating member, thereby retaining the slider in a neutral position in which the slider is not displaced in the sliding direction, the second engagement portion being shaped such that when an operating force in the sliding direction is applied to the operating member, the second engagement portion presses against the first engagement portion while being displaced in the sliding direction relative to the first engagement portion and causes the bending deformation of the flexible portion, the first engagement portion and the second engagement portion are shaped such that an amount of deformation of the flexible portion increases with an amount of operation of the operating member in the sliding direction, and the first engagement portion has a dimension that gradually increases in the first direction from the neutral position toward an outer side in the sliding direction.

3. The composite operating device according to claim 2, further comprising a first transmission member and a first transmission member pressing portion that presses against the first transmission member.

4. The composite operating device according to claim 2, wherein the slider has a first clamp portion that holds a pressed portion between the first clamp portion and a first transmission member pressing portion from both sides in the sliding direction.

5. The composite operating device according to claim 2, wherein the slider has a retaining portion that has a cylindrical shape.

6. The composite operating device according to claim 2, wherein:

the base comprises the flexible portion and a base main body that supports the slider, the slider comprises the second engagement portion, the flexible portion is integrally formed with the base main body so as to be continuous with the base main body and is capable of bending deformation in the predetermined direction relative to the base main body, the first engagement portion comprises a locking portion that locks the slider such that in a state in which no operating force in the sliding direction is applied to the operating member, the slider is retained in the neutral position, and the second engagement portion comprises a locked portion that is locked into the locking portion when no operating force in the sliding direction is applied to the operating member and that presses against the first engagement portion, thereby causing bending deformation of the flexible portion, when an operating force in the sliding direction is applied to the operating member.

7. The composite operating device according to claim 6, wherein:

the flexible portion extends from the base main body in a second direction that is orthogonal to each of the first direction and the sliding direction, and is capable of elastic deformation so as to allow the first engagement portion to be displaced in the first direction.

8. The composite operating device according to claim 6, wherein:

the flexible portion comprises a base end portion that is continuous with the base main body and a displacement end portion that is an end portion on a side that is opposite to the base end portion and constitutes a free end, and the first engagement portion is formed in the displacement end portion.

9. The composite operating device according to claim 6, wherein the base main body has a flat plate portion with an upper wall and the at least one slit includes a plurality of slits, the plurality of slits being formed in the upper wall and each of the plurality of slits are spaced apart from each other in the sliding direction.

10. The composite operating device according to claim 9, wherein each of the plurality of slits are parallel to each other.

* * * * *